(12) United States Patent
Rahmati et al.

(10) Patent No.: US 11,302,883 B2
(45) Date of Patent: Apr. 12, 2022

(54) MULTIPLE-LAYER QUANTUM-DOT LED AND METHOD OF FABRICATING SAME

(71) Applicant: 10644137 CANADA INC., Calgary (CA)

(72) Inventors: Mohammad Rahmati, Calgary (CA); Majid Pahlevaninezhad, Calgary (CA); Sam Scherwitz, Calgary (CA)

(73) Assignee: 10644137 CANADA INC., Calgary (CA)

( * ) Notice: Subject to any disclaimer, the term of this patent is extended or adjusted under 35 U.S.C. 154(b) by 197 days.

(21) Appl. No.: 16/652,464

(22) PCT Filed: Oct. 15, 2018

(86) PCT No.: PCT/CA2018/051297
§ 371 (c)(1),
(2) Date: Mar. 31, 2020

(87) PCT Pub. No.: WO2019/071362
PCT Pub. Date: Apr. 18, 2019

(65) Prior Publication Data
US 2020/0235326 A1 Jul. 23, 2020

Related U.S. Application Data

(60) Provisional application No. 62/572,056, filed on Oct. 13, 2017.

(51) Int. Cl.
*H01L 51/50* (2006.01)
*G06F 30/23* (2020.01)
(Continued)

(52) U.S. Cl.
CPC .......... *H01L 51/502* (2013.01); *C09K 11/562* (2013.01); *C09K 11/88* (2013.01);
(Continued)

(58) Field of Classification Search
CPC ............... H01L 51/502; H01L 51/5056; H01L 51/5072; H01L 51/5088
See application file for complete search history.

(56) References Cited

U.S. PATENT DOCUMENTS

2006/0134460 A1  6/2006 Kondakova et al.
2012/0156545 A1  6/2012 Holme et al.
(Continued)

FOREIGN PATENT DOCUMENTS

| CN | 105870349 A | 8/2016 |
| CN | 106784208 A | 5/2017 |
| WO | 2017140047 A1 | 8/2017 |

OTHER PUBLICATIONS

Extended European Search Report dated May 3, 2021, issued in corresponding EP Application 18865669.8. (8 pages).
(Continued)

*Primary Examiner* — Anthony Ho
(74) *Attorney, Agent, or Firm* — Chamberlain, Hrdlicka, White, Williams & Aughtry

(57) ABSTRACT

A quantum-dot (QD) light-emitting diode (QLED) device has a multiple-layer active emission region. The multiple-layer active emission region has n QD layers interleaved with (n−1) quantum-barrier (QB) layers where n is a positive integer greater than one, such that each QB layer is sandwiched between two adjacent QD layers.

20 Claims, 18 Drawing Sheets

(51) Int. Cl.
  *C09K 11/56* (2006.01)
  *C09K 11/88* (2006.01)
  *H01L 51/00* (2006.01)
  *H01L 51/52* (2006.01)
  *G06F 111/10* (2020.01)

(52) U.S. Cl.
  CPC ............ *G06F 30/23* (2020.01); *H01L 51/004* (2013.01); *H01L 51/0037* (2013.01); *H01L 51/0042* (2013.01); *H01L 51/5056* (2013.01); *H01L 51/5072* (2013.01); *H01L 51/5088* (2013.01); *H01L 51/5206* (2013.01); *H01L 51/5221* (2013.01); *G06F 2111/10* (2020.01); *H01L 2251/301* (2013.01); *H01L 2251/308* (2013.01); *H01L 2251/533* (2013.01); *H01L 2251/558* (2013.01)

(56) References Cited

U.S. PATENT DOCUMENTS

2018/0054872 A1 2/2018 Xu et al.
2018/0233688 A1 8/2018 Chen et al.

OTHER PUBLICATIONS

"APSYS User's Manual"; Crosslight Software Inc.; Version 2005. 11, 1st Edition, 2005.
B. Chandar Shekar et al.; "Spin coated nano scale PMMA films for organic thin film transistors"; Physics Procedia; vol. 49; pp. 145-157; 2013.
B. O. Dabbousi et al.; "(CdSe)ZnS Core-Shell Quantum Dots: Synthesis and Characterization of a Size Series of Highly Luminescent Nanocrystallites"; J. Phys. Chem. B; vol. 101, No. 46; pp. 9463-9475; 1997.
Benjamin S. Mashford et al.; "High-efficiency quantum-dot light-emitting devices with enhanced charge injection"; Nature Photonics; vol. 7; pp. 407-412; May 2013.
Bingyan Zhu et al.; "Low turn-on voltage and highly bright Ag—In—Zn—S quantum dot light-emitting diodes"; Journal of Materials Chemistry C; vol. 6, No. 17; pp. 4683-4690; 2018 (DOI: 10.1039/c0xx00000x).
C. B. Murray et al.; "Synthesis and Characterization of Monodisperse Nanocrystals and Close-Packed Nanocrystal Assemblies"; Annual Review of Materials Science; vol. 30, No. 1; pp. 545-610; 2000.
Claudia Pacholski et al.; "Self-Assembly of ZnO: From Nanodots to Nanorods"; Angew. Chem. Int. Ed.; vol. 41, No. 7; pp. 1188-1191; 2002.
Dmitri V. Talapin et al.; "Highly Luminescent Monodisperse CdSe and CdSe/ZnS Nanocrystals Synthesized in a Hexadecylamine-Trioctylphosphine Oxide-Trioctylphospine Mixture"; Nano Letters; vol. I, No. 4; pp. 207-211; 2001.
Dong Ick Son et al.; "Carrier transport mechanisms of organic bistable devices fabricated utilizing colloidal ZnO quantum dot-polymethylmethacrylate polymer nanocomposites"; Applied Physics Letters; vol. 97, No. 013304; 2010 (doi: 10.1063/1.3454774).
Dong-Hyun Lee et al.; "Effect of hole transporting materials in phosphorescent white polymer light-emitting diodes"; Organic Electronics; vol. 11; pp. 427-433; 2010.
Eric A. Meulenkamp; "Synthesis and Growth of ZnO Nanoparticles"; J. Phys. Chem. B; vol. 102, No. 29; pp. 5566-5572; 1998.
Fanxu Meng et al., "An organic-inorganic hybrid UV photodetector based on a TiO2 nanobowl array with high spectrum selectivity"; RSC Adv.; vol. 3; pp. 21413-21417; 2013.
Fei Chen et al.; "Enhanced Performance of Quantum Dot-Based Light-Emitting Diodes with Gold Nanoparticle-Doped Hole Injection Layer"; Nanoscale Research Letters; vol. 11; 2016 (DOI 10.1186/s11671-016-1573-8).

G. Parthasarathy et al.; "High-efficiency transparent organic light-emitting devices"; Appl. Phys. Lett.; vol. 76, No. 15; pp. 2128-2130; Apr. 10, 2000.
G.F. Yang et al.; "InGaN/GaN multiple quantum wells on selectively grown GaN microfacets and the applications for phosphor-free white light-emitting diodes"; Reviews in Physics; vol. 1; pp. 101-119; Nov. 2016.
Giulia Venturi et al.; "Dislocation-related trap levels in nitride-based light emitting diodes"; Applied Physics Letters; vol. 104, 211102; 2014 (doi: 10.1063/1.4879644).
H. Q. Zhang et al.; "The optical and electrical characteristics of PMMA film prepared by spin coating method"; IOP Conf. Ser.: Mater. Sci. Eng.; vol. 87, 012032; Jun. 2015.
Han Zhang et al.; "Ultrastable Quantum-Dot Light-Emitting Diodes by Suppression of Leakage Current and Exciton Quenching Processes"; ACS Applied Materials & Interfaces; vol. 8, No. 45; pp. 31385-31391; 2016.
Hong Hee Kim et al.; "Inverted Quantum Dot Light Emitting Diodes using Polyethylenimine ethoxylated modified ZnO"; Scientific Reports; vol. 5, No. 8969; 2015 (https://doi.org/10.1038/srep08968).
Huiren Peng et al.; "Efficient Quantum-Dot Light-Emitting Diodes With 4,4,4-Tris(N-Carbazolyl)-Triphenylamine (TcTa) Electron-Blocking Layer"; IEEE Electron Device Letters; vol. 36, No. 4; pp. 369-371; Apr. 2015.
Imad Al—Deen Hussein Ali Al—Saidi, Raghad Jabar; "Investigation of Optical Properties of Solochrome Dark Blue Dye Doped Polymer Films"; ; Journal of Materials Physics and Chemistry; vol. 5, No. 1; pp. 32-38, 2017.
International Preliminary Report on Patentability issued in corresponding Application No. PCT/CA2018/051297, dated Jan. 10, 2020.
International Search Report issued in corresponding Application No. PCT/CA2018/051297, dated Jan. 4, 2019.
J. Jack Li et al. "Large-Scale Synthesis of Nearly Monodisperse CdSe/CdS Core/Shell Nanocrystals Using Air-Stable Reagents via Successive Ion Layer Adsorption and Reaction"; J. Am. Chem. Soc.; vol. 125, No. 41; pp. 12567-12575; 2003.
Jens Meyer et al.; "Transparent Inverted Organic Light-Emitting Diodes with a Tungsten Oxide Buffer Layer"; Adv. Mater.; vol. 20; pp. 3839-3843; 2008.
Jeonghun Kwak et al.; "Bright and Efficient Full-Color Colloidal Quantum Dot Light-Emitting Diodes Using an Inverted Device Structure"; Nano Letters; vol. 12; pp. 2362-2366; 2012.
Jiangyong Pan et al.; "A highly efficient quantum dot light emitting diode via improving the carrier balance by modulating the hole transport"; RSC Adv.; vol. 7, No. 69; pp. 43366-43372; 2017.
Joachim Piprek et al.; "On the uncertainty of the Auger recombination coefficient extracted from InGaN/GaN light-emitting diode efficiency droop measurements"; Applied Physics Letters vol. 106, 101101; 2016 (doi: 10.1063/1.4914833).
Khan Qasim et al; "Large-Area Quantum-Dot Light Emitting Diode Arrays with ZnO Nanoparticles as Electron Transport/Injection Layer"; Science of Advanced Materials; vol. 6, No. 12; pp. 2625-2631; Dec. 2014.
L.N. Ismail et al.; "Electrical Properties of Spin Coated PMMA for OFETs Applications"; 2011 International Conference on Electronic Devices, Systems and Applications (ICEDSA); pp. 333-338; Apr. 25-27, 2011.
Lei Qian et al.; "Stable and efficient quantum-dot light-emitting diodes based on solution-processed multilayer structures"; Nature Photonics; vol. 5; pp. 543-548; Sep. 2011.
M. Mehrjoo et al.; "A novel process for synthesis of CdSe/ZnS core-shell QDs and their application for the Methyl orange (MO) degradation"; Materials Chemistry and Physics; vol. 201; pp. 165-169; Nov. 2017 (doi: 10.1016/j.matchemphys.2017.08.033).
Moon Kee Choi et al.; "Flexible quantum dot light-emitting diodes for next-generation displays"; npj Flexible Electronics; vol. 2, No. 10; 2018 (doi:10.1038/s41528-018-0023-3).
N. Chestnoy et al.; "Luminescence and Photophysics of CdS Semiconductor Clusters: The Nature of the Emitting Electronic State"; J. Phys. Chem.; vol. 90, No. 15; pp. 3393-3399; 1986.

(56) References Cited

OTHER PUBLICATIONS

P. D'Angelo et al.; "Electrical transport properties characterization of PVK (poly N-vinyl carbazole) for electroluminescent devices applications"; Solid-State Electronics; vol. 51; pp. 123-129; 2007.
Peter Reiss et al.; "Highly Luminescent CdSe/ZnSe Core/Shell Nanocrystals of Low Size Dispersion"; Nano Letters; vol. 2, No. 7; pp. 781-784; 2002.
Polina O. Anikeeva et al.; "Quantum Dot Light-Emitting Devices with Electroluminescence Tunabe over the Entire Visibe Spectrum"; Nano Letters; vol. 9, No. 7; pp. 2532-2536, 2009.
Qianqian Huang et al.; "High-performance quantum dot light-emitting diodes with hybrid hole transport layer via doping engineering"; Optics Express; vol. 24, No. 23; pp. 25955-25963; Nov. 14, 2016.
Qin Zhang et al.; "Enhancing extraction efficiency of quantum dot light-emitting diodes by surface engineering"; Opt. Express; vol. 25, No. 15; pp. 17683-17694 ; Jul. 24, 2017.
Qingjiang Sun et al.; "Bright, multicoloured light-emitting diodes based on quantum dots"; Nature Photonics; vol. 1; pp. 717-722; Dec. 2007.
Qingjiang Sun et al.; "Multilayer white polymer light-emitting diodes with deoxyribonucleic acid-cetyltrimetylammonium complex as a hole-transporting/electron-blocking layer"; Applied Physics Letters; vol. 92, 251108; 2008 (doi: 10.1063/1.2948864).
Sebastian Reineke et al.; "White organic light-emitting diodes: Status and perspective"; Reviews of Modern Physics; vol. 85, No. 3; pp. 1245-1294; Jul.-Sep. 2013.
Sergey Dayneko et al.; "Effect of surface ligands on the performance of organic light-emitting diodes containing quantum dots"; Proc. SPIE; vol. 9270; pp. 927009-1; 2014.
Shih-Shou Lo et al.; "ZnO/poly(N-vinylcarbazole) coaxial nanocables for white-light emissions"; Journal of Materials Chemistry C; vol. 3; pp. 686-692; 2015.
Sotirios Baskoutas et al.; "Size-dependent band gap of colloidal quantum dots"; Journal of Applied Physics; vol. 99, 013708; 2006 (http://dx.doi.org/10.1063/1.2158502).
Stephen R. Forrest et al.; "Measuring the Efficiency of Organic Light-Emitting Devices"; Adv. Mater.; vol. 15, No. 13; pp. 1043-1048; Jul. 4, 2003.
Uli Würfel et al.; "Charge Carrier Separation in Solar Cells"; IEEE Journal of Photovoltaics; vol. 5, No. 1; pp. 461-469; Jan. 2015.
V. L. Colvin et al.; "Light-emitting diodes made from cadmium selenide nanocrystals and a semiconducting polymer"; Nature; vol. 370; pp. 354-357; Aug. 4, 1994.
Weigao Wang et al.; "Highly transparent quantum-dot light-emitting diodes with sputtered indium-tin-oxide electrodes"; J. Mater. Chem. C; vol. 4; pp. 1838-1841; 2016 (DOI: 10.1039/C5TC04223B).
Written Opinion issued in corresponding Application No. PCT/CA2018/051297, dated Jan. 4, 2019.
Xiao Jin et al.; "Efficient light-emitting diodes based on reverse type-I quantum dots"; Optical Materials Express; vol. 7, No. 12; pp. 4395-4407; Dec. 2017.
Xingliang Dai et al.; "Solution-processed, high-performance light-emitting diodes based on quantum dots"; Nature; vol. 515, No. 7525; pp. 96-99; Oct. 2014.
Xuyong Yang et al.; "Highly Flexible, Electrically Driven, Top-Emitting, Quantum Dot Light-Emitting Stickers"; ACS Nano; vol. 8, No. 8; pp. 8224-8231; 2014.
Yajie Dong et al.; "Ultra-Bright, Highly Efficient, Low Roll-off Inverted Quantum-Dot Light Emitting Devices (QLEDs)"; SID Symposium Digest of Technical Papers; vol. 46, No. I; pp. 270-273; 2015.
Yibin Jiang et al.; "Optimizing the Balance of Holes and Electrons in Inverted Quantum Dot Light-Emitting Diodes by Inserting Electron Transportation Barrier Layer"; SID Symposium Digest of Technical Papers; vol. 46, No. 1; pp. 274-277; Jul. 2015.
YouJong Lee et al.; "Development of inverted OLED with top ITO anode by plasma damage-free sputtering"; Thin Solid Films; vol. 517; pp. 4019-4022; 2009.
Zaifang Li et al.; "A low-work-function, high-conductivity PEDOT:PSS electrode for organic solar cells with a simple structure"; Synthetic Metals; vol. 210; pp. 363-366; 2015.
Zhuo-Ting Huang et al.; "Electron transport in solution-grown TIPS-pentacene single crystals: Effects of gate dielectrics and polar impurities"; Chinese Chemical Letters; vol. 27, No. 12; pp. 1781-1787; Dec. 2016.

MULTIPLE-LAYER QUANTUM-DOT LED AND METHOD OF FABRICATING SAME

CROSS-REFERENCE TO RELATED APPLICATIONS

This application claims the benefit of U.S. Provisional Patent Application Ser. No. 62/572,056, filed Oct. 13, 2017, the content of which is incorporated herein by reference in its entirety.

FIELD OF THE DISCLOSURE

The present disclosure relates generally to a quantum-dot light-emitting diode, and in particular to a light-emitting diode having an active emission region with high external quantum efficiency formed by a plurality of interleaved quantum-dot layers and quantum-barrier layers, and a method of fabricating same.

BACKGROUND

Quantum dots (QDs), a type of semiconductor nanoparticles, have been the subject of recent scientific studies. QDs are extremely small nanocrystal semiconductor materials with typical diameters of about 2 to 10 nanometers (nm). Compared to bulk materials, QDs have many unique characteristics such as high color saturation, narrow spectra, tunable emission wavelengths, durability, and simple fabrication process (see references [1] to [10]) thereby rendering QDs a promising material for making light-emitting diodes (LEDs) suitable for various applications such as display devices, lasers, digital signage, illumination or lighting devices, and the like. Quantum-dot LEDs (QLEDs) can have better energy efficiency due to their high quantum yield for electroluminescence and their device structure designed for efficient charge injection. QLEDs usually have much longer lifetime comparing to other types of illumination devices such as incandescent lightbulbs, fluorescent lightbulbs, and organic LEDs (OLEDs). Moreover, the cost of QLEDs is also reduced while mass production thereof becoming available.

QDs exploit the quantum confinement effects in semiconductors. Quantum confinement effects occur when the size of a particle is at the scale of electron-hole distance of an electron-hole pair, also known as the exciton Bohr radius. In QDs, the sizes of the crystals are in the same order as the exciton Bohr radius. Such small sizes imply that the crystals are in discrete energy levels which can be explained by the energy of a particle in an infinite potential well (also known as a "particle-in-a-box" state). The relationship of the energy level of a QD and the size thereof may be described in Equation (1) which is the band gap energy for a spherical box (same lengths in all three dimensions).

$$E_p = \frac{p^2 \times h^2}{8 \times m \times L^2} = h\nu, \quad (1)$$

where p=1, 2, . . . is the energy level index, $E_p$ is the energy at the p-th level, h is the Plank's constant, m is the effective mass of a point charge, and L is the radius of the particle. Equation (1) shows that the energy $E_p$ changes with size variation of the QDs (i.e., variation of L) because the excitation in the QDs behaves like a "particle-in-a-box". Moreover, Equation (1) indicates that the energy of a particle of light, i.e., a photon, is proportional to its frequency ν with the coefficient of the Plank's constant factor h. Therefore, changing the size of QDs can create different wavelengths and in turn different colors.

Emission spectra of QD solutions show a full width at half maximum (FWHM) of 30 nm to 40 nm, depending on the degree of monodispersity achieved during the colloidal synthesis of QD. Smaller FWHM gives rise to higher color purity which is important in luminescent applications. Moreover, QDs can be used for white lighting which can be evaluated by its color temperature and color rendering index (CRI).

Core-shell type composite quantum dots exhibit properties attractive for light emitters. It has been shown that over-coating nanocrystallites with higher band-gap inorganic materials improves the photoluminescence quantum yields by passivating non-radiative recombination sites. Cadmium Selenide/Zinc Sulfide (CdSe/ZnS) quantum-dot structure shows high quantum yield (40% to 60%) which makes it a good candidate as emitters in QLEDs. In addition to high quantum yield, core-shell CdSe/ZnS particles have narrow band edge luminescence, resulting in spanning most of the visible spectrum (from 470 to 625 nm). ZnS over-coated particles are more robust than organically passivated dots and potentially more useful for optoelectronic device structures. Electroluminescent devices such as QLEDs can incorporate CdSe/ZnS dots into light-emitting devices. This may show greater stability during the fabrication process.

In addition, CdSe/ZnS have much longer lifetime comparing to bare CdSe quantum dots due to the surface passivation. In summary, CdSe/ZnS have better energy efficiency due to their high quantum yield. Their core-shell structure may be used for efficient charge-injection alongside with longer lifetime.

FIG. 1 is a schematic diagram showing the structure of a typical prior-art QLED 10. As shown, the QLED 10 comprises a substrate 12 such as glass, an anode 14 of Indium Tin Oxide (ITO), a hole-injection layer (HIL) 16 of poly(3, 4-ethylenedioxythiophene) polystyrene sulfonate (i.e., PEDOT:PSS) with a thickness of about 50 nm, a hole-transport layer (HTL) 18 of poly(9-vinlycarbazole) (i.e., PVK) with a thickness of about 50 nm, an active emission region 20, an electron-transport layer/hole-blocking layer (ETL/HBL) 22 of Zinc Oxide (ZnO) with a thickness of about 45 to 100 nm, and a cathode 24 of silver (Ag) with a thickness of about 100 nm.

The active emission region 20 comprises one or more CdSe/ZnS core-shell QD layers equivalent to one thick QD layer. For example, the active emission region 20 typically has a thickness of about 15 to 90 nm, corresponding to about 1 to 6 CdSe/ZnS QD layers.

When an electrical power source 26 applies an electric field to the QLED 10, the HIL 16 (via the HTL 18) and the ETL 22 respectively inject holes and electrons into the active emission region 20, in which the injected holes and electrons are captured in the QDs thereof and radiatively recombined to emit photons. Therefore, the active emission region 20 may also be denoted as an emissive layer.

In prior-art QLEDs 10, the HTL 18 is used for preventing the non-radiative recombination of holes and electrons (which is undesired recombination without photon emission) that may otherwise occur at the interface of the active emission region 20 and the HIL 16 if the HTL 18 was not used.

ITO is widely employed as an anode contact due to its high conductivity and high transparency. In typical QLEDs, Aluminum (Al) is used as the cathode 24. As Al may degrade in air and decrease the efficiency of QLED 10, Ag may be used in cathode contact 24. ITO may also be used in cathode contact 24 to increase the light extraction efficiency of the QLED 10.

The Ag thin film is usually deposited using thermal evaporation techniques. However, surface of the underlying layer is bombarded with high-energy particles created by a sputtering process which creates defects in the active emission region 20 and leads to an increased leakage current, thereby leading to reduced efficiency and a reduced lifetime of the active emission region. Inorganic ZnO thin film layer is employed as a protective layer from bombarding QD layers. Moreover, ZnO also acts as a HBL 22 in QLED 10 and prevents hole leakage or overflow from the active emission region 20. Inorganic ZnO nanocrystals may also be used as an ETL due to their high electron mobility and matched valance and conduction energy levels compared to QDs band gap.

Very thin layers of ZnO are easily implemented by means of several deposition techniques such as spin-coating, sol-gel, spray-coating and nanoparticle deposition. To reduce the high dislocation density caused by large crystal lattice mismatch in the active emission region 20 such as between the CdSe/ZnS QD layers and to increase the light-extraction efficiency for fabricating high-performance QLEDs 10, the as-deposited films usually need a process of annealing usually at moderate temperatures (about 100° C.) in order to optimize the crystalline structure. All layers except the anode 14 and cathode 24, are fabricated by a spin-coating method under ambient air condition. The array of CdSe/ZnS is manufactured layer-by-layer by self-assembly in a spin-coating process in which a QD solution in a solvent material is poured onto a substrate and is then set spinning to spread the solution evenly. At each step, a heat treatment is used to decrease the dislocation densities caused by different lattice parameters of layers and for vaporizing the solvents required for the spin-coating process.

In general, using thick QD layers in the design of QLED decreases the internal efficiency of the QLED because of the density of dislocations caused by mismatch of the crystal lattices (lattice mismatch) among two different adjacent layers of the QLED. The defects caused in the QLED fabrication decrease the internal efficiency of the QLED due to the non-radiative recombination. With the presence of defects such as dislocation, some electrons may be attracted to the defects instead of being injected into the active emission region 20. As a result, the amount of radiative recombination decreases. Therefore, in order to prevent fabrication of a QLED with defects, the thickness of layer should be less than de Broglie wavelength of that material such as about 50 nm for the semiconductors used in optical devices.

The QLED structure can be tuned over the entire visible wavelength range from 460 nm (blue) to 650 nm (red) and over the most invisible part of violet-blue spectrum (350 to 450 nm). The emission wavelengths have continuously been extended to ultraviolet (UV) and near infrared (NIR) range by tailoring the chemical composition of the QDs and the device structure.

Moreover, it is known that a major drawback of QLED is the electron leakage which leads to efficiency droop at high-current densities. One of the explanations for efficiency droop is caused by an electron-leakage mechanism that has little effect at low currents, but becomes significant at high currents.

Thus, the major drawback of QLEDs is their lower efficiency compared to OLEDs, which is due to electron leakage and charge balance (see references [11] to [14]). Many studies have been conducted to investigate and eliminate these barriers by using various types of inorganic and organic materials in the architecture of device.

Pan et al. have shown that current efficiency of 26.2 cd/A, power efficiency of 19.2 lm/W, and external quantum efficiency of 6.2% may be reached by modifying the hole transport layer by using blend solution of TAPC and PVK at the HTL (see reference [15]).

Dai et al. have shown that by adding a layer of poly (methyl methacrylate) (i.e., PMMA) between the active layer and ZnO, the external quantum efficiency may be increased drastically up to 15% by reducing the electron leakage from cathode (see reference [16]).

Zhang et al. have studied the effect of Poly[N,N'-bis(4-butylphenyl)-N,N'-bisphenylbenzidine] (i.e., Poly-TPD) as a hole transport layer at the structure, and shown that external quantum efficiency of QLED may be increased up to 12% (see reference [17]).

Dong et al. have used cesium carbonate films as the electron injection and hole blocking layers and reported the luminance of 165,000 Cd/m$^2$ with the current density of 1000 mA/cm$^2$ with a low driving voltage of 5.8 V (see reference [18]).

Kim et al. have suggested a polyethylenimine ethoxylated (i.e., PEIE) blended with ZnO nanoparticles as electron injection and transport layer for inverted structure red CdSe/ZnS QLED (see reference [19]). The PEIE facilitates the enhancement of electron injection into the active layer by reducing the work-function of ZnO from 3.58 eV to 2.87 eV. Kim et al. have reported a device with a maximum luminance and current efficiency values of 8600 Cd/m$^2$ and current efficiency of 1.53 cd/A, respectively.

Jiang et al. have shown that by inserting thin barrier layer of PVK and 4,4',4"-tris(N-carbazolyl)triphenylamine (TCTA) in the electron transportation layer, the efficiency may be improved from 3.5 Cd/A to 7.8 Cd/A (see reference [20]).

Yang et al. have used multiple InGaN/GaN quantum wells to modify the structure of the active layer to fabricate phosphor-free white light LEDs (see reference [21]).

Zhang et al. have coated $Al_2O_3$ between ZnO and QDs and 4,4'-bis(carbazol-9-yl)biphenyl (i.e., CBP) layers (i.e., having a structure of CBP/$Al_2O_3$/QD/$Al_2O_3$/ZnO) which significantly improves device performance up to 15.3 Cd/A (see reference [11]).

SUMMARY

According to one aspect, a method for decreasing the electron leakage in QLED is disclosed. The method uses multilayer quantum-barrier (QB) layers as a wetting layer between layers of CdSe/ZnS quantum dots (QDs). In some embodiments, the QB layers may be formed by Poly(methyl methacrylate) (i.e., PMMA), the particular band gap of which prevents electrons from passing active emission region without recombination thereby decreasing the electron leakage.

According to one aspect, there is disclosed a color-saturated QLED device. The QLED device comprising a multiple-layer active emission region. The active emission region comprises n QD layers interleaved with (n−1) QB layers where n is a positive integer greater than one such that each QB layer is sandwiched between an adjacent pair of QD layers.

In some embodiments, the QD layers comprise colloidal CdSe/ZnS QD emitters, and the QB layers are PMMA thin layers.

In some embodiments, each CdSe/ZnS QD layer has a thickness of about one to twenty times of that of each QD layer. In some embodiments, each CdSe/ZnS QD layer has a thickness of about eight times of that of each QB layer. In some embodiments, each CdSe/ZnS QD layer has a thickness of about 15 nm to 35 nm and each quantum barrier layer has a thickness of about 2 nm to 4 nm.

The PMMA QB layers also act as wetting layers separating the QD layers for preventing electron leakage.

In some embodiments, the active emission region is sandwiched between an ETL/HBL and a HIL.

In some embodiments, the ETL/HBL is made of ZnO nanoparticles and is coupled to the active emission region for injecting electrons, maintaining an optimal charge balance for the QD emitters, blocking holes, and protecting QDs during deposition process of silver (Ag) cathode. The strong electronic coupling between the QD layers and the ETL facilitates charge transfer.

The HIL may be made of poly(3,4-ethylenedioxythiophene) polystyrene sulfonate (i.e., PEDOT:PSS).

In some alternative embodiments, the QLED comprises a separate HTL between the active emission region and the HIL. The HTL may be made of poly(9-vinlycarbazole) (i.e., PVK) and Poly [N,N'-bis(4-butylphenyl)-N,N'-bisphenyl-benzidine] (i.e., Poly-TPD).

The performance of the QLED device can be modified by controlling the thickness of one or more of the QD and QB layers, and/or by adjusting the number of these layers. The QLED devices exhibit an external quantum efficiency of more than 5%. Heat treatment may be used to decrease the stress between different layers of the QLED device for increasing the efficiency of the device.

According to one aspect, there is disclosed the fabrication of a series of highly-saturated red-color QLEDs using colloidal CdSe/ZnS (core-shell) QD nanoparticle emitters with an architecture comprising a number of active layers separated by QB layers. In some embodiments, PMMA dissolved in acetone is used as the QB material. The wider bandgap of PMMA acts as a quantum barrier and prevents electrons from passing the active emission region without radiative recombination, thereby reducing the electron leakage at high current densities. In various embodiments, the radiative recombination may be modified by changing the number of QB layers in the recombination zone. By introducing quantum barriers into the active emission region, the current efficiency of QLEDs may be increased threefold from 6.7 to 19.0 cd/A with a maximum luminance of 207000 cd/m$^2$ at 8 volts (V).

According to one aspect, there is provided a quantum-dot (QD) light-emitting diode (QLED) device. The QLED device comprises an active emission region. The active emission region comprises n QD layers interleaved with (n−1) quantum-barrier (QB) layers where n is a positive integer greater than one, such that each QB layer is sandwiched between two adjacent QD layers.

In some embodiments, each QD layer comprises Cadmium Selenide/Zinc Sulfide (CdSe/ZnS).

In some embodiments, each QB layer comprises Poly (methyl methacrylate) (PMMA).

In some embodiments, n=3.

In some embodiments, n=5.

In some embodiments, the thickness of each QD layer is about eight times of that of each QB layer.

In some embodiments, the thickness of each QD layer is about 15 nm to 35 nm, and the thickness of each QB layer is about 1 nm to 5 nm.

In some embodiments, the thickness of each QD layer is about 15 nm to 35 nm, and the thickness of each QB layer is about 2 nm to 4 nm.

In some embodiments, the QLED device further comprises an electron-transport layer (ETL); and a hole-injection layer (HIL). Said ETL and HIL sandwich the active emission region therebetween.

In some embodiments, the ETL comprises synthesized ZnO nanocrystals, and the HIL comprises poly(3,4-ethylenedioxythiophene) polystyrene sulfonate (PEDOT:PSS).

In some embodiments, the QLED device further comprises a hole-transport layer (HTL) sandwiched between the active emission region and the HIL.

In some embodiments, the HTL comprises poly(9-vinlycarbazole) (PVK).

In some embodiments, the QLED device further comprises a cathode layer coupled to the ETL; an anode layer coupled to the HIL; and a transparent substrate coupled to the anode layer.

In some embodiments, the cathode layer comprises silver, and the anode layer is a transparent layer comprising Indium Tin Oxide (ITO).

In some embodiments, each QB layer has a conductive band higher than that each QD layer.

In some embodiments, the energy at the valence band of each QB layer is higher than the energy at the valence band of each QD layer.

In some embodiments, each QB layer comprises PVK, 4,4'-Cyclohexylidenebis[N,N-bis(4-methylphenyl)benzenamine] (TAPC), or Poly[N,N'-bis(4-butylphenyl)-N,N'-bisphenylbenzidine] (Poly-TPD).

According to one aspect, there is provided a QLED device comprising a plurality of layers sequentially coupled together. The plurality of layers comprises, from a first side to a second side thereof: a cathode layer; an electron-transport layer (ETL); an active emission region; a hole-injection layer (HIL); and an anode layer. The active emission region comprises n quantum-dot (QD) layers interleaved with (n−1) quantum-barrier (QB) layers where n is a positive integer greater than one, such that each QB layer is sandwiched between two adjacent QD layers.

In some embodiments, each QD layer comprises Cadmium Selenide/Zinc Sulfide (CdSe/ZnS).

In some embodiments, each QB layer comprises Poly (methyl methacrylate) (PMMA).

In some embodiments, n may be 3 or 5 or an integer between 2 (inclusive) and 6 (inclusive).

In some embodiments, the thickness of each QD layer is about eight times of that of each QB layer.

In some embodiments, the thickness of each QD layer is about 15 nm to 35 nm, and the thickness of each QB layer is about 2 nm to 4 nm.

BRIEF DESCRIPTION OF THE DRAWINGS

FIGS. 7A to 7C show the experiment results of different multiple-QD-layer QLEDs and conventional QLEDs, wherein FIG. 7A shows a comparison of output powers of the multiple-QD-layer QLED devices shown in FIG. 2A, at a voltage of 8 volts (V);

FIG. 7B shows a comparison of output powers of a multiple-QD-layer QLED device and a conventional QLED device at a voltage of 8 V;

FIG. 7C shows the current density versus voltage characteristics of a multiple-QD-layer QLED device and a conventional QLED device, with the insert showing the CIE (Commission Internationale de l'Elcairage) color coordinates of the multiple-QD-layer QLED device;

DETAILED DESCRIPTION

Embodiments herein disclose a QLED device having a multiple-layer active emission region. The active emission region comprises n QD layers interleaved with (n–1) QB layers where n is a positive integer greater than one such that each QB layer is sandwiched between an adjacent pair of QD layers.

The active emission region may be sandwiched between a hole-injection layer (HIL) and an electron-transport layer/hole-blocking layer (ETL/HBL).

A hole-transporting layer (HTL) may be applied between the active emission region and the HIL.

The multiple-layer structure of the disclosed QLED device solves or at least alleviates the challenge of bringing electrons and holes together in small regions for efficient radiative recombination to emit photons without escaping or dissipating. By using an active-region having a plurality of emissive QD layers, electrons and holes may be transferred directly from the surfaces of the ETL and HTL into the active emission region and radiatively recombined therein, thereby providing high recombination efficiency.

QLED Device Structure

Figure 1:
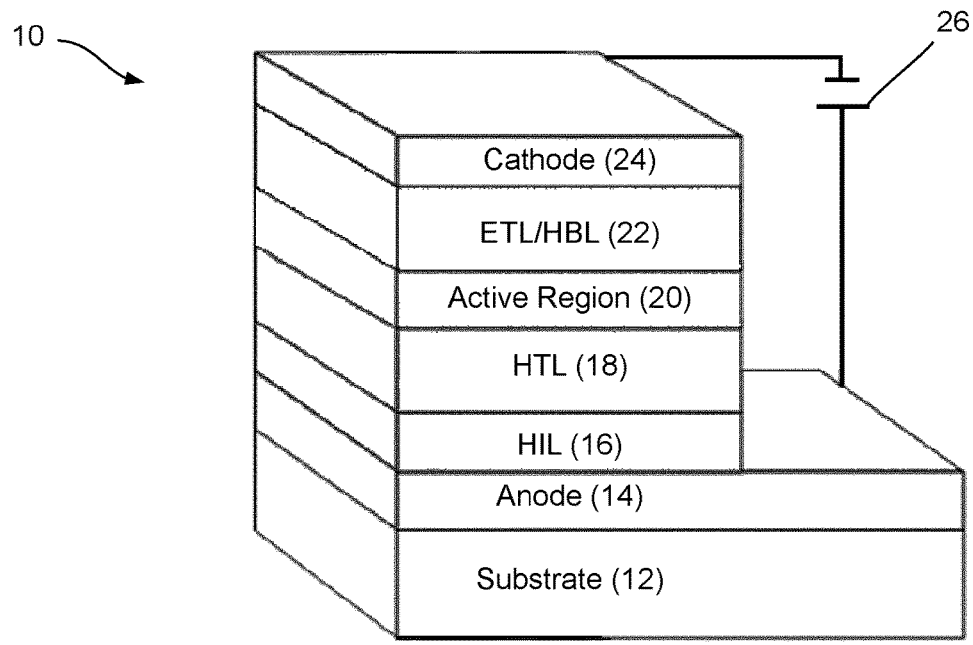
FIG. 1 is a schematic diagram illustrating the structure of a prior-art QLED.
Figure 2A:
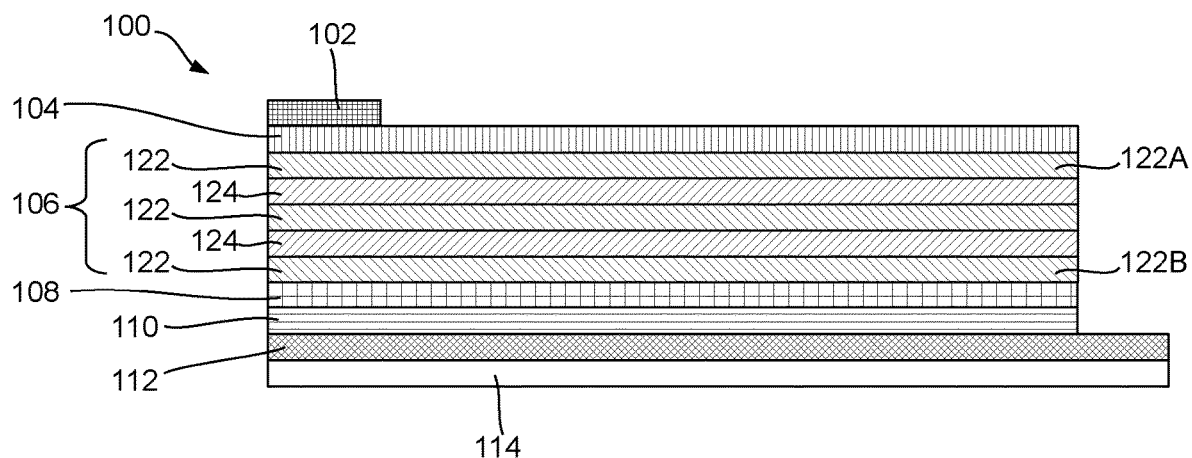
FIG. 2A is a schematic diagram illustrating the structure of a multiple-QD-layer QLED device, according to some embodiments of this disclosure.
Figure 2B:
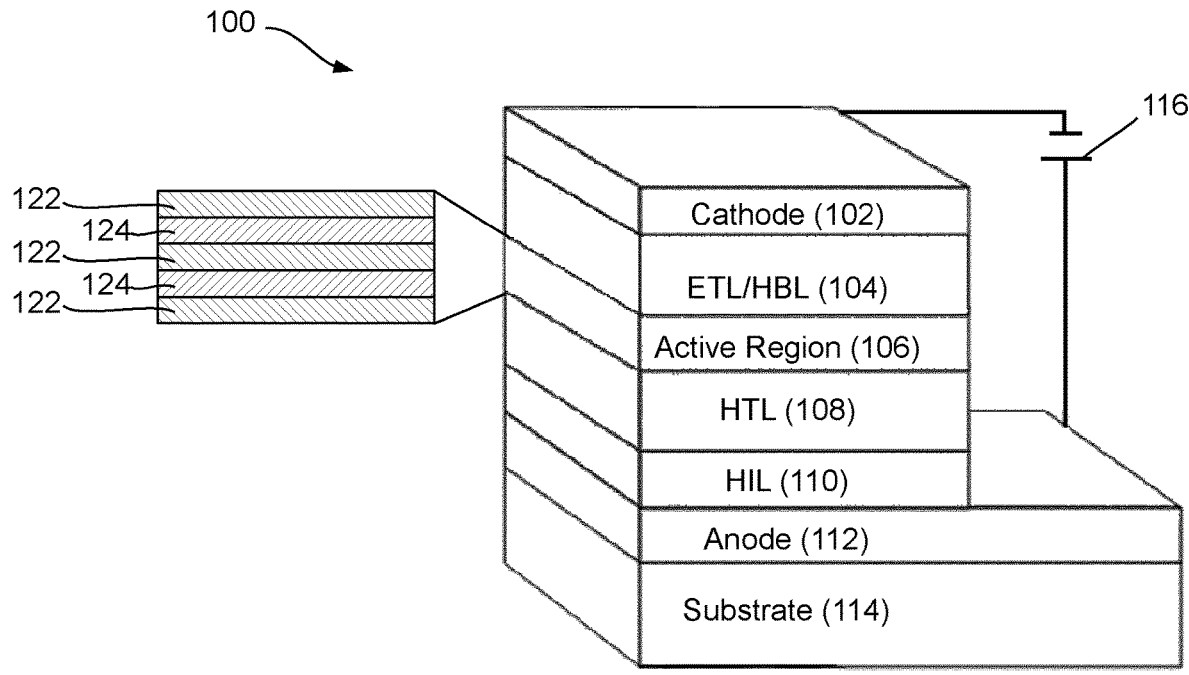
FIG. 2B is a schematic diagram illustrating the multiple-QD-layer QLED device shown in FIG. 2A powered by an electrical power source.

Turning now to FIGS. 2A and 2B, a multiple-QD-layer QLED device is shown and is generally identified using reference numeral 100. In these embodiments, the multiple-QD-layer QLED device 100 is a one-side transparent device "transparent" on the anode side (described later) and light may be emitted from the anode side and reflected from the cathode side (described later) of the multiple-QD-layer QLED device 100 (see FIG. 3).

The multiple-QD-layer QLED device 100 comprises a plurality of layers 102 to 112 of different materials sequentially coupled together and to a substrate 114 (or otherwise deposited thereto). In particular, the multiple-QD-layer QLED device 100 in these embodiments comprises, sequentially named from the substrate 114, an anode layer 112, a HTL 108, an active emission region 106, an ETL/HBL 104, and a cathode layer 102. In these embodiments, the anode layer 112 is transparent and the cathode layer 102 is non-transparent.

The active emission region 106 comprises a plurality of thin QD layers 122 such as one (1) to five (5) QD layers 122 interleaved with one or more QB layers 124 such that each QB layer 124 is sandwiched between a pair of adjacent QD layers 122. Therefore, the number of the QD layers 122 is greater than that of the QB layers 124 by one (1). In other words, the active emission region 106 comprises n QD layers interleaved with (n−1) QB layers where n is a positive integer greater than one.

The QB layer 124 is used to decrease electron leakage from the active emission region 106. In these embodiments, the QB layers 124 also act as wetting layers. In experimental physics, a wetting layer is an initial layer of atoms that is grown on a surface upon which self-assembled quantum dots or thin films are created.

In the example shown in FIGS. 2A and 2B, the active emission region 106 comprises three (3) QD layers 122 interleaved with two (2) QB layers 124. Each QB layer 124 is sandwiched between two adjacent QD layers 122.

QB layers 124 are used for preventing or at least decreasing electron/hole leakage. In above embodiments, each QD layer 122 (except the two outermost QD layers 112A and 122B) is sandwiched between an adjacent pair of QB layers 124. The pair of QB layers 124 retain electrons within the QD layer 122 sandwiched therebetween, and thus help increase the concentration of electrons in the QD layer 122.

The QD layer 122A adjacent the ETL 104 does not require any quantum barrier layer therebetween as the ETL 104 injects electrons into the QD layer 122A and thereby electrons would unlikely (i.e., with a small probability) move from the QD layer 122A into the ETL 104. The QD layer 122B adjacent the HTL 108 does not require any quantum barrier layer therebetween as the HTL 108 acts as an EBL and thereby electrons would unlikely move from the QD layer 122A into the HTL 108.

The thickness of the QD layer 122 and that of the QB layer 124 significantly impact the performance of the multiple-QD-layer QLED device 100. In some embodiments, the thickness of each QD layer 122 is greater than that of each QB layer 124. For example, in one embodiment, each QD layer 122 is a thin QD film with a thickness of about 15 nm to 35 nm. The thickness of each QB layer 124 is about 1 nm to 5 nm. In some embodiments, the thickness of each QD layer 122 is preferably about eight (8) times of that of each QB layer 124. For example, each QD layer 122 has a thickness of about 15 nm to 35 nm and each QB layer 124 has a thickness of about 2 nm to 4 nm.

Materials of Various Layers

The various layers 102 to 114, 122 and 124 may be made of any suitable materials. For example, the cathode 102 may be made of a suitable non-transparent material such as silver (Ag), but may also be made of other suitable non-transparent or transparent material such as non-transparent Aluminum (Al), transparent ITO, or the like, in some alternative embodiments. The anode 112 may be made of transparent Indium Tin Oxide (ITO), and the substrate 114 may be made of a transparent supportive material such as glass.

The ETL 104 may be an inorganic layer made of Zinc Oxide (ZnO) such as synthesized ZnO nanocrystals which have a valence band and a conduction band at 7.5 electron-volts (eV) and 4.2 eV, respectively, thereby suitable for use as the ETL 104 or a hole-blocking layer (HBL) for improving the performance of the multiple-QD-layer QLED 100.

The HTL 108 may be made of poly(9-vinlycarbazole) (i.e., PVK) which has a valence band and a conduction band at 5.8 eV and 2.3 eV, respectively. In some alternative embodiments, the HTL 108 may be made of PVK and further improved by addition of Poly [N,N'-bis(4-butylphenyl)-N,N'-bisphenylbenzidine] (i.e., Poly-TPD). In some alternative embodiments, the HTL 108 may be made of N,N'-diphenyl-N,N'-bis(1-naphthyl-phenyl)-(1,1'-biphenyl)-4,4'-diamine (i.e., NPB), 4,4',4"-tri(N-carbazolyl)triphenylamine (i.e., TCTA), 4,4'-Cyclohexylidenebis [N,N-bis(4-methylphenyl)benzenamine] (i.e., TAPC), poly-TPD, or a mixture thereof. Of course, other suitable materials may alternatively be used.

The HIL 110 may be made of poly(3,4-ethylenedioxythiophene) polystyrene sulfonate (i.e., PEDOT:PSS) which has a band diagram located at 5 eV. A conductive polymer such as poly(3,4-ethylenedioxythiophene) doped with poly (styrene sulfonate) anions (PEDOT:PSS) is widely used in various organic optoelectronic devices. PEDOT:PSS is a blend of cationic polythiopene derivative, doped with a polyanion. Such polymers exhibit high electrical conductivity and good oxidation resistance thereby suitable for electromagnetic shielding. Thus, the polymer film has been found to possess high transparency throughout the visible light spectrum and even in NIR and near UV spectrum regions with virtually 100% absorption from 900 nm to 2,000 nm.

Cadmium Selenide/Zinc Sulfide (CdSe/ZnS) has a valence band and a conduction band at 6.7 eV and 3.4 eV in vacuum, respectively. In the active emission region 106, each QD layer 122 is made of CdSe/ZnS-derived nanoparticles which form a large number of QDs for capturing and recombining electrons and holes injected thereinto to emit photons or light. As each QD layer 122 has a small thickness of about 15 nm to 35 nm which is less than de Broglie wavelength (approximately 50 nm) of the CdSe/ZnS-derived nanoparticles, the crystal lattice mismatch is reduced thereby improving the light emission efficiency.

In these embodiments, each QB layer 124 is made of Poly(methyl methacrylate) (i.e., PMMA). PMMA has a broad bandgap (see references [22] and [23]) and may be used for preventing highly mobile electrons from passing the active emission region 106 without recombination.

The interleaved QD layers 122 and QB layers 124 form an active emission region 106 that electrons cannot escape, thereby leading to the decrement of electron leakage and increment of external efficiency. Simulation results (described later) show that using interleaved QD layers 122 and QB layers 124 can increase the rate of recombination since the conduction band of QB layers 124 are wider than that of the QD layers 122. Consequently, the probability of recombination of electrons and holes in the active emission region 106 increases.

EXAMPLE

In this example, the multiple-QD-layer QLED device 100 comprises an active emission region 106 formed by a plurality of CdSe/ZnS QD layers 122 interleaved with one or more QB layers 124 with each QB layer 124 sandwiched between a pair of adjacent CdSe/ZnS QD layers 122. As described above, the multiple QB layers 124 significantly reduce electron leakage.

In this example, the substrate 114 and anode 112 are made from a patterned ITO-glass substrate with a sheet resistance of 14-16 $\Omega sq^{-1}$, offered by Thin Film Devices Incorporated of Anaheim, Calif., U.S.A, with the coated ITO as the anode layer 112.

The HIL 110 is made from poly(ethylenedioxythiophene)/polystyrenesulfonate, Al 4083, which is one of the most commonly used PEDOT:PSS formulations offered by Ossila Ltd of Sheffield, UK.

The HTL 108 is made of PVK with an average molecular weight of 1,100,000 g/mol.

The ETL 104 is formed by synthesized ZnO nanocrystals made from zinc acetate dehydrate (≥98%) and potassium hydroxide (≥85%), offered by Sigma Aldrich Corporation of St. Louis, Mo., U.S.A.

In this example, ZnO nanoparticles may be prepared by a method reported by Pacholski et al. (see references [24] to [26]) with modifications. According to the modified method, 2.46 grams (g) of Zn(Ac)2.2H2O is dissolved in 55 milliliters (ml) of methanol at 60° C. for 30 minutes. Then, 25 ml of a methanol solution containing 0.96 g of KOH (potassium hydroxide) is added dropwise at 60° C. while stirring constantly. The reaction mixture is stirred two hours under Argon (Ar) atmosphere (i.e., an environment filled with noble gas of Ar for isolating the reaction mixture from $O_2$) at a constant temperature of 60° C. The obtained product appears as a white solution with ZnO nanocrystals therein. The ZnO nanocrystals are further washed with methanol twice at the speed of 1500 rpm for 1 minute. To prepare the 20 mg/ml ZnO solution, 200 mg of nanocrystals are re-dispersed in 10 ml n-butanol and 200 μl ethanolamine. The solution is filtered with 0.2 μm Polyvinylidene difluoride (PVDF) membrane filters before use.

The cathode 102 is made of silver pellets with a purity of 99.99% offered by R.D. Mathis Company of Long Beach, Calif., U.S.A.

The QD layers 122 are made from CdSe/ZnS/octadecylamine (630 nm, quantum yield (QY)>40%) offered by NN-LABS, LLC of Fayetteville, Ark., U.S.A.

The QB layers 124 are made from PMMA with an average molecular weight of 120,000 g/mol.

With above-described materials, the multiple-QD-layer QLED device 100 may be fabricated via the following fabrication process.

The substrate 114 may be sonicated in soap bath and rinsed with suitable purified water and ethanol. The purified water may be made of any suitable water-purification technology such as reverse osmosis (RO). After rinsing, the substrate may be emerged in isopropanol bath and sonicated for 5 minutes in a warm sonic bath. For the hydrophilic surface treatment, the substrate may be sonicated in fresh 10 vol. % NaOH solution for 5 minutes in the warm sonic bath and rinsed twice in hot water and finally dried by blowing $N_2$ gas.

PEDOT:PSS may be filtered with a rubber-free syringe through a 0.45 μm PVDF membrane filter. Then, the filtered PEDOT:PSS is spin-coated onto the pre-cleaned ITO-substrate at 3000 rpm for 60 seconds followed by baking at 150° C. for 30 minutes, thereby forming the HIL 110.

To form the HTL 108, PVK may be dissolved in chlorobenzene with a concentration of 10 mg/ml and spin-coated onto the HIL 110 at 3000 rpm for 60 seconds and baked at 150° C. for 30 minutes.

To form each QD layer 122, CdSe/ZnS QDs may be dissolved in n-octane (5 mg/ml) and spin-coated onto the HTL 108 or the neighboring QB layer 124 at 1000 rpm for 45 seconds followed by annealing at 110° C. for 5 minutes. Each CdSe-ZnS QD layer 122 has a thickness of about 25 nm.

To form each QB layer 124, PMMA may be dissolved in acetone (100 μg/ml) and spin-coated on the neighboring QD layer 122 at 2000 rpm for 45 seconds followed by annealing at 110° C. for 5 minutes. Each PMMA QB layer 124 has a thickness of about 3 nm.

In this example, three CdSe/ZnS QD layers 122 interleaved with two PMMA QB layers 124 are formed.

After forming the active emission region 106 (i.e., the interleaved QD layers 122 and QB layers 124), ZnO nanoparticles obtained as described above may be dispersed in a 20 mg/ml (n-butanol) solution and then spin-coated onto the "topmost" QD layer 122 at 3000 rpm for 50 seconds followed by baking at 60° C. for 30 minutes, thereby forming an ETL 104 with a thickness of about 90 nm.

The "top" Ag cathode layer 102 may be deposited onto the ETL 104 by thermal evaporator with a power of 20 W, a pressure of $2\times10^{-6}$ mbar and a deposition time of 25 minutes thereby forming a cathode layer 102 of about 100 nm. The multiple-QD-layer QLED device 100 is then formed.

Figure 3:
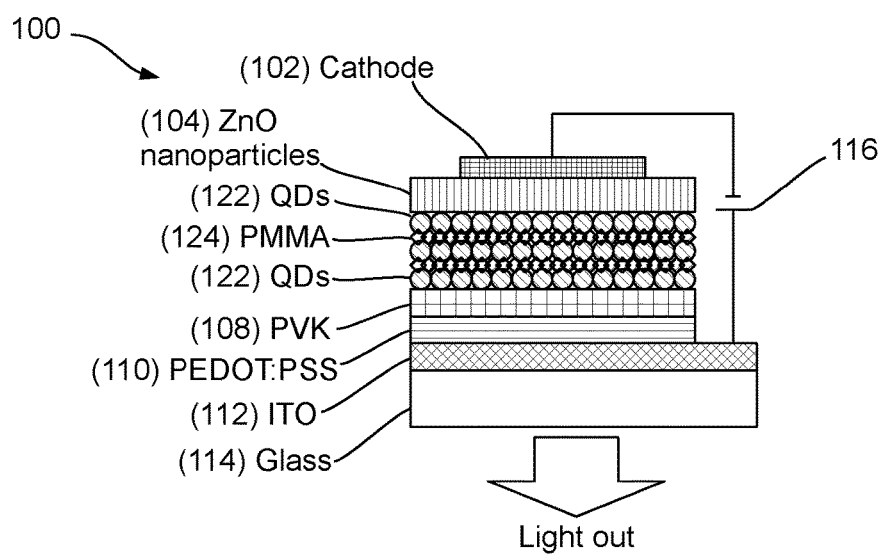
FIG. 3 is a schematic diagram illustrating the structure of an example of the multiple-QD-layer QLED device shown in FIG. 2A used in experiments.

As shown in FIG. 3, the multiple-QD-layer QLED device 100 fabricated as above has a structure of glass as the substrate 114, ITO as the anode 112, PEDOT:PSS as the HIL 110, PVK as the HTL 108, interleaved CdSe-ZnS layers (each about 25 nm thickness, as the QD layers 122) and PMMA layers (each about 3 nm thickness, as the QB layers 124) forming the active emission region 106, ZnO (about 90 nm thickness) as the ETL 104, and Ag (about 100 nm thickness) as the cathode 102. By coupling the multiple-QD-layer QLED device 100 to a Direct-Current (DC) power source 116, the multiple-QD-layer QLED device 100 emits light from its anode side.

Figure 4:
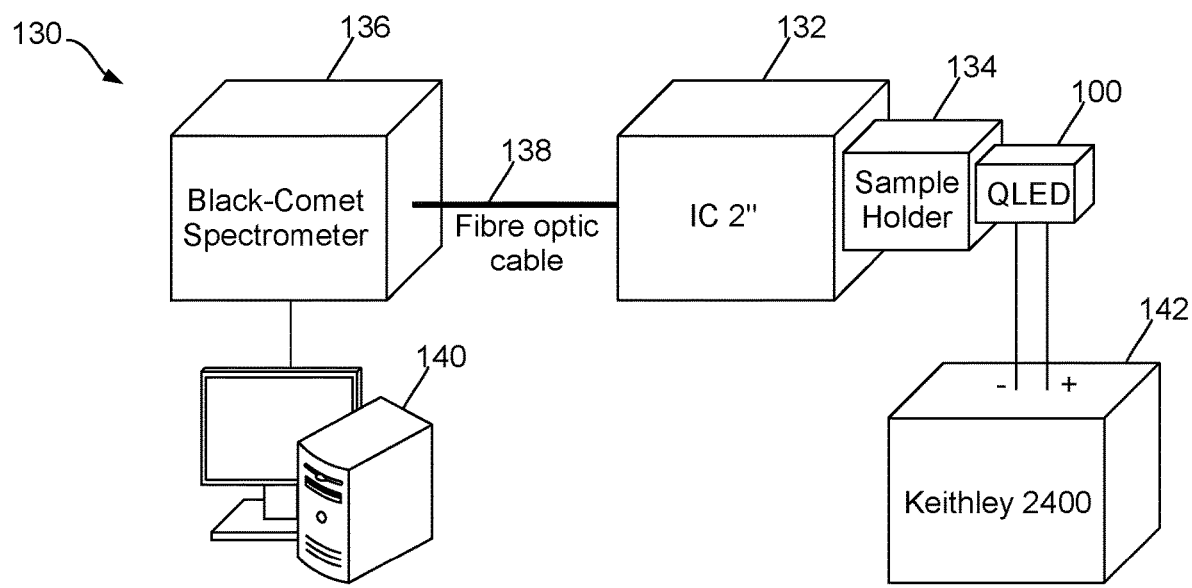
FIG. 4 shows a LED measurement system for testing the multiple-QD-layer QLED devices shown in FIG. 2A.
Figure 5A:
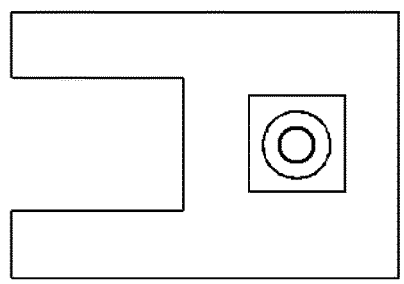
FIGS. 5A to 5C are the plan view, bottom view, and perspective view of a sample holder fabricated by three-dimensional (3D) printing for use in the LED measurement system shown in FIG. 4.
Figure 5B:
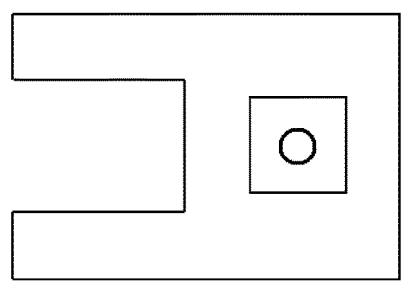
Figure 5C:
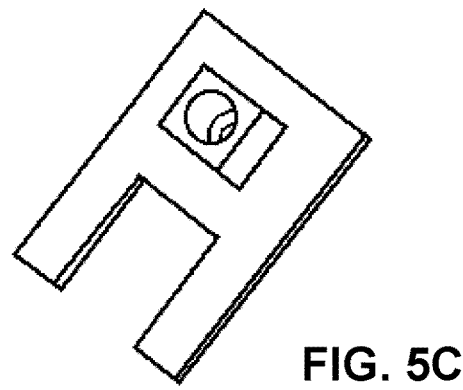

As shown in FIG. 4, the multiple-QD-layer QLED device 100 may be tested using a LED measurement system 130 comprising an integrating receptor 132 (2×2×2 inches with a ⅝-inch input port) having a sample holder 134 (see FIGS. 5A to 5C) for holding the multiple-QD-layer QLED device 100. A Black-Comet spectrometer 136 for UV-to-visible spectrum (190 nm to 850 nm) is coupled to the integrating receptor 132 via a F600-VISNIR fibre optic cable 138 offered by StellarNet Inc. of Tampa, Fla., U.S.A. for measuring the total power (Watts and Lumens) and Color Rendering Index (CRI) (see reference [27]) with measurement results sent to a computing device 140. The I-V characteristic (i.e., the Current-voltage characteristic or the I-V curve) of the multiple-QD-layer QLED device 100 is measured using a Keithley 2400 SourceMeter 142 offered by Tektronix, Inc. of Beaverton, Oreg., U.S.A.

Figure 6A:
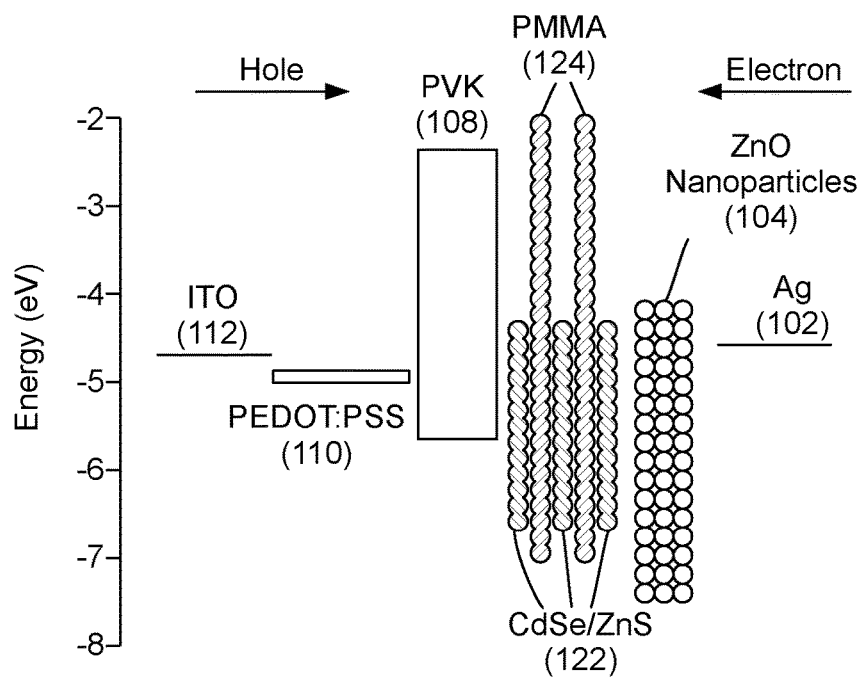
FIG. 6A is a flat-band energy level diagram of the multiple-QD-layer QLED device shown in FIG. 2A.
Figure 6B:
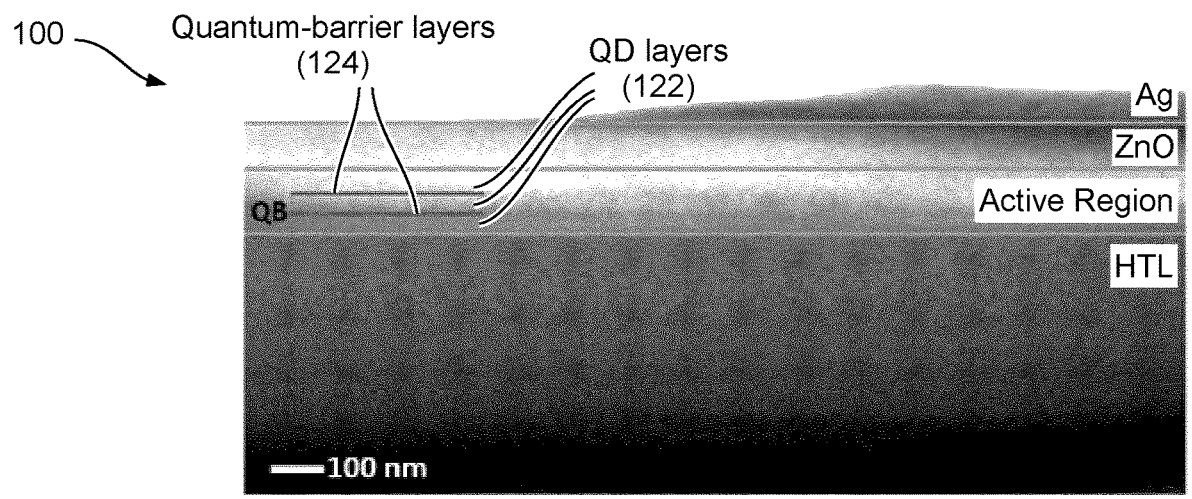
FIG. 6B is a scanning electron microscope (SEM) image showing the cross-section of the multiple-QD-layer QLED device shown in FIG. 2A.

FIG. 6A is a flat-band energy level diagram of the multiple-QD-layer QLED device 100. FIG. 6B is a scanning electron microscope (SEM) image showing the cross-section of the multiple-QD-layer QLED device 100.

In most QLEDs, PEDOT:PSS is frequently used for the HIL due to its deep work function and provides efficient hole injection to the active layer (see reference [28]). Deploying a HTL to move away from the injection interfaces, can be very useful. PVK energy levels match those of the active layer which makes it a good candidate for a HTL (see reference [29]). Also, PVK has a higher valence band compared to CdSe/ZnS nanoparticles (see references [30] and [31]). This facilitates the injection of electrons and holes to the adjacent layer. CdSe/ZnS QD nanoparticles are widely used as an active layer for QLEDs due to their simple synthesis methods, QY efficiency and wide range of tunibility (see references [32] to [36]). Moreover, inorganic ZnO nanocrystals are commonly used as ETLs due to their high electron mobility and matched energy level compared to that of adjacent active layer (see references [21] to [23]). In addition, the thick film of ZnO nanoparticles can serve as a protective layer for QDs during the deposition of Ag (see references [41] to [44]). FIG. 6A shows that ZnO nanoparticles are in favor of electron transport due to its similar lowest unoccupied molecular orbital (LUMO) level with the conductive band of QDs.

One of the major drawbacks of the conventional QLEDs is the efficiency droop caused by electron leakage (see references [12] and [13]). Electron leakage occurs when highly mobile electrons cannot recombine with holes due to the difference in the mobility of holes and electrons (see reference [15]). The hole mobility of PVK is $2.5 \times 10^{-6}$ cm$^2 \cdot$V$^{-1} \cdot$s$^{-1}$ (see references [45] and [46]) and electron mobility of ZnO is $1.0 \times 10^{-3}$ cm$^2 \cdot$V$^{-1} \cdot$s$^{-1}$ for thin films (see reference [16]). This leads to inefficient injection of charge at the active layer resulting in a lower rate of radiative recombination.

Therefore, a good candidate for the quantum barriers must have three properties: First, the electron mobility and hole mobility of the polymer should be high enough to work as a bridge, letting electrons and holes pass efficiently. Second, in order to prevent electrons from passing without radiative recombination, the conductive band of the QB layer 124 should be significantly higher than the conductive band of the QD. Third, the QB layer 124 should have higher energy at the valence band compared to the QD such that holes can pass through the QD layer without facing a large energy gap. If the quantum barrier satisfies these conditions, electrons will face a significant energy barrier when passing the active layer, which leads to a higher concentration of electrons at the active layer (see references [22] and [23]).

Thin film of PMMA possesses the above-mentioned energy bandgap properties, which makes it a strong candidate for QB layers 124. Moreover, using PMMA with acetone as a solvent for forming the QB layers 124 would not wash or remove the CdSe/ZnS dissolved in octane. Therefore, in some embodiments, it is preferable to use PMMA as the QB layers 124. Conventional QLED fabrication methods/processes may be used for fabricating the multiple-QD-layer QLED device 100 in these embodiments.

As PMMA is an insulator polymer, each spin-coated PMMA QB layer is required to have a small or thin thickness such that it would not block the current. Ismael et al. have shown that by reducing the thickness of PMMA layer, the conductivity increases significantly (see reference [49]). In this example, each CdSe/ZnS QD layer 122 has a thickness of about 25 nm, and each PMMA QB layer 124 has a thickness of about 3 nm. In the SEM image shown in FIG. 6B, the PMMA QB layers 124 (indicated by the dark lines) are hardly visible because the adjacent QD layers 122 obstructs the imaging of the PMMA QB layers 124.

In some alternative embodiments, thin layers of hole-transport polymers with above-mentioned energy bandgap properties, such as PVK, TAPC, and Poly-TPD (see references [15], [20], [47], and [48]), may be used as the QB layers 124. However, a drawback of using these polymers as the QB layers 124 is that the corresponding fabrication process of the multiple-QD-layer QLED device 100 may be difficult as most of these polymers may contain benzene solvents which may cause the removal or wash-off of the underlying QD layer 122. One may form the QD layers with a thickness greater than required, for compensating possible wash-off, and carefully control the fabrication conditions when forming the QB layers 124 to control the wash-off to the QD layers 122. However, such a process may be difficult.

Alternatively, one may use other suitable QD materials with above-described QB materials. Examples of QD materials include materials using CdSe, CdTe, CdS, or InP as core and using ZnS, ZnSe, ZnTe, CdS, CdSe,CdTe, PbS, PbSe, PbTe, or InAs as shell.

Experiment and Simulation Results

Figure 7A:
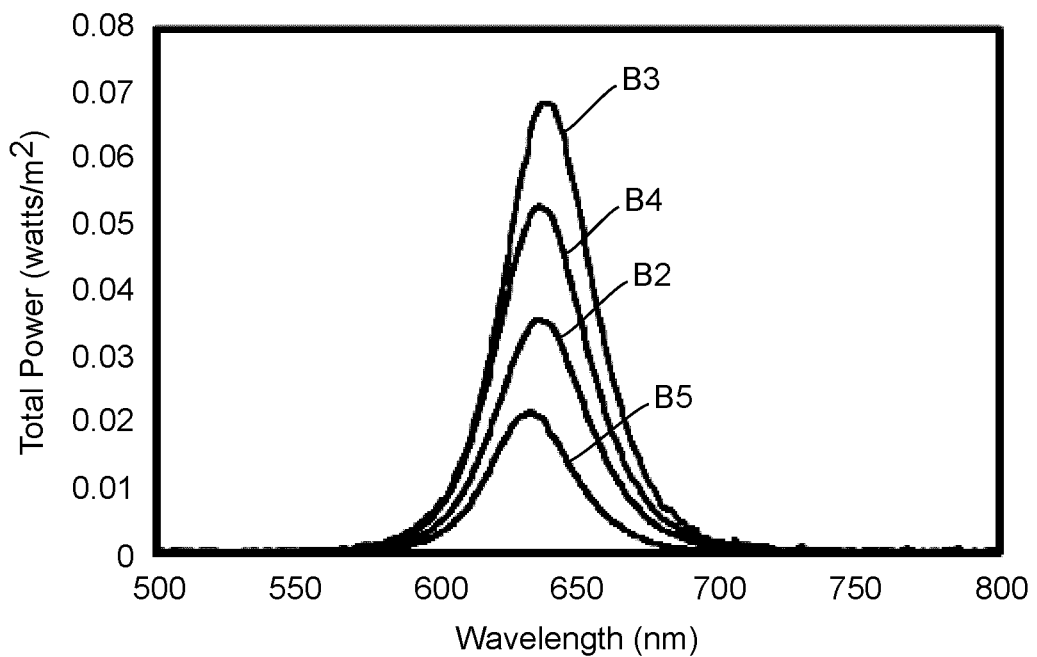
Figure 7B:
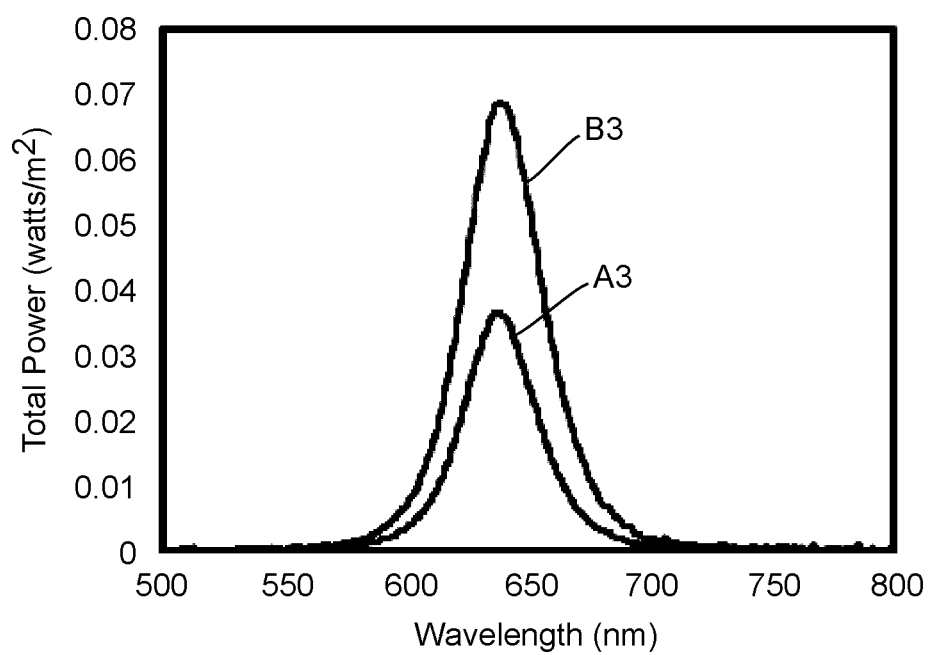
Figure 7C:
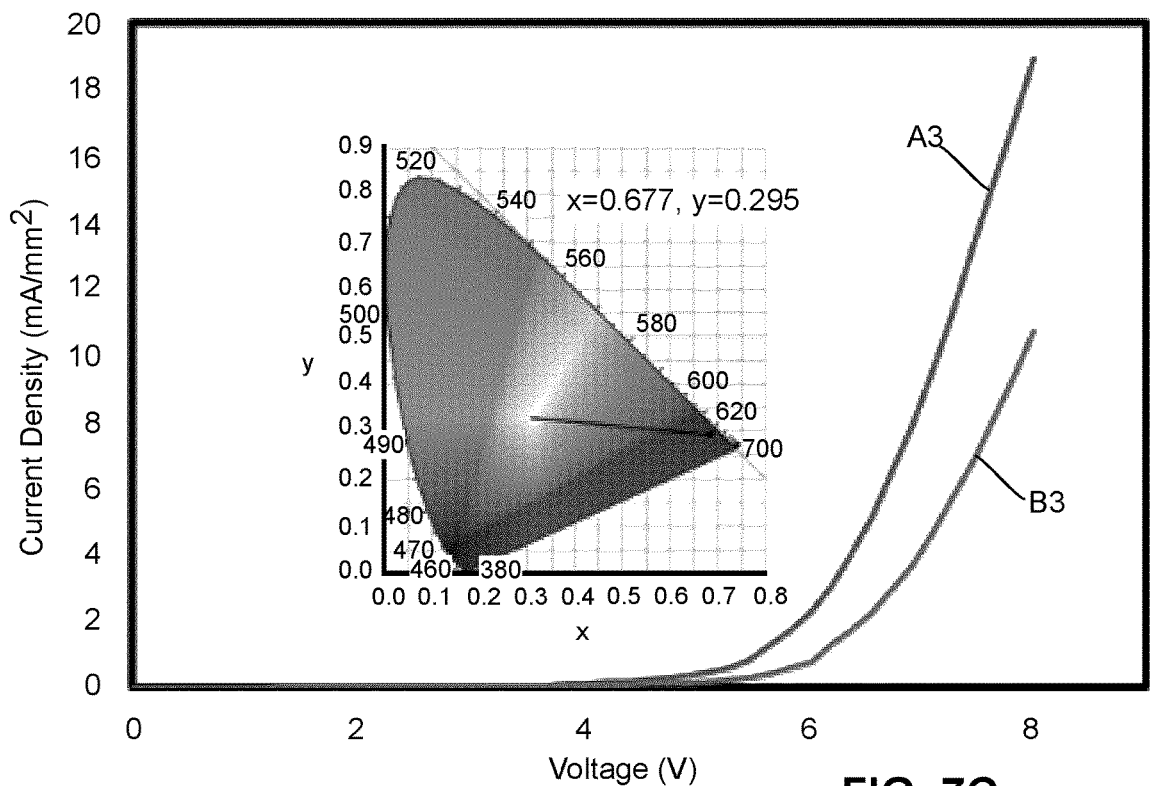

FIGS. 7A to 7C show the experiment results of different multiple-QD-layer QLED devices 100 and conventional QLED devices. In these figures, Bn represents a multiple-QD-layer QLED device 100 having an active emission region 106 comprising n CdSe/ZnS QD layers 122 interleaved with (n–1) PMMA QB layers 124 fabricated as described above, where n=2, 3, 4, 5, . . . , and An represents a conventional QLED device having a single CdSe/ZnS QD layer with a thickness about or equal to the total thickness of the QD layers 122 of Bn but with no QB layers.

FIG. 7A shows a comparison of output powers of the multiple-QD-layer QLED devices 100 at a voltage of 8 volts (V). The multiple-QD-layer QLED devices 100 in this comparison have n QD layers 122 interleaved with (n–1) PMMA QB layers 124 fabricated as described above, where n=2, 3, 4, or 5. As can be seen, the multiple-QD-layer QLED device 100 having three (3) QD layers 122 interleaved with two (2) PMMA QB layers 124 (i.e., B3) exhibits the largest power output. It is known that using PMMA with acetone as the solvent can reduce the roughness of the underlying layers (see reference [16]). Moreover, more layers may cause more dislocations and traps propagating in the active emission region. Therefore, with the increase of the number of PMMA QB layers 124 to more than four layers, the efficiency of the multiple-QD-layer QLED device 100 may significantly decrease. Blue shifting effects also become dominant when four PMMA QB layers 124 are used due to large energy band gap of the QB layers.

FIG. 7B shows a comparison of output powers of a multiple-QD-layer QLED device B3 and a conventional QLED device A3 at a voltage of 8 V. The multiple-QD-layer QLED device B3 has an active emission region 106 comprising three CdSe/ZnS QD layers 122 interleaved with PMMA QB layers 124. The conventional QLED device A3 has a CdSe/ZnS QD layer with a thickness about or equal to the total thickness of the three CdSe/ZnS QD layers 122 of B3 but with no QB layers. As shown, the multiple-QD-layer QLED device B3 has a power output significantly larger than that of the conventional QLED device A3. In particular, the peak of B3 is 1.88 times of that of A3.

The significantly greater output-power of the multiple-QD-layer QLED device B3 shows that interleaved QB layers 124 significantly increases the concentration of electrons at the active layer at 8 V.

Moreover, those skilled in the art will appreciate that an increased thickness of a CdSe/ZnS QD layer may cause severe lattice mismatch and may subsequently cause an increased number of dislocations and defaults. Such dislocations and defaults may lead to trap spots for electrons and holes thereby increasing non-radiative recombination and lowering efficiency (see reference [52]).

Therefore, by substantially dividing the thick CdSe/ZnS QD layer of A3 into a plurality of thin QD layers 122 of B3, lattice mismatch and energy traps in each thin CdSe/ZnS QD layer 122 in B3 are reduced which in turn leads to increased radiative-recombination and increased output-power.

FIG. 7C shows the current density versus voltage characteristics of B3 and A3 with the insert showing the CIE (Commission Internationale de l'Elcairage) color coordinates of B3. The current densities of B3 and A3 dramatically increase (e.g., to 0.02 mA/mm² which causes the QLED devices B3 and A3 to emit light at a visible light strength) when the voltage reaches 3.5 V and 2 V, respectively. The operating voltage of B3 is higher than A3 which may be due to the presence of non-conductive PMMA QB layers 124 in the active emission region 106. Moreover, the wide energy bandgap of PMMA also implies high voltages to start the injection of excitons. Compared to B3, the conventional QLED device A3 does not have any PMMA QB layers and requires lower voltages to turn on. The symmetric emission peak at 638 nm with a narrow full-width at half-maximum of 34.7 nm corresponds to the CIE color coordinates of (x=0.677, y=0.295), which are close to the spectral locus and preferable for display applications.

Table 1 shows a comparison of A3 and B3 in terms of operating voltage, full width at half maximum (FWHM) and efficiency. As shown, B3 has a higher operating voltage as the PMMA QB layers 124 require higher driving voltage for a operating current. FWHMs of A3 and B3 are in the range of 35 nm to 40 nm thereby promising for pure color emissions (see reference [53]). The presence of the PMMA QB layers 124 in B3 increases the current efficiency from 6.7 Cd/A to 19.0 Cd/A, increases power efficiency from 2.6 Lm/W to 7.5 Lm/W and increases luminescent from 111,000 Cd/m² to 207,000 Cd/m².

TABLE 1

Comparing Current efficiency and Power efficiency of A3 and B3.

| Sample | A3 | B3 |
| --- | --- | --- |
| Operating Voltage (V) | 6 | 6.6 |
| Testing Voltage (V) | 8 | 8 |
| FWHM (nm) | 34.6 | 37.4 |
| Current (mA) | 148 | 98 |
| Luminescent (Cd/m²) | 111,000 | 207,000 |
| Current Efficiency (Cd/A) | 6.7 | 19 |
| Power Efficiency (Lm/W) | 2.6 | 7.5 |
| Active Layer | QD/QD/QD | QD/PMMA/QD/PMMA/QD |

Simulations of the multiple-QD-layer QLED device 100 are conducted using APSYS, a software package of the Advanced Physical Models of Semiconductor Devices offered by Crosslight Software Inc. of Vancouver, BC, Canada (see reference [54]), for determining the optimal number of PMMA QB layers 124 for enhancing the radiative recombination rate. In the simulations, The CdSe/ZnS over PMMA band offset ratio is considered to be 0.75. The properties of PMMA are defined based on the reference [55]. In the simulations, the electron and hole concentrations at the active layer under a bias voltage are studied.

Figure 8A:
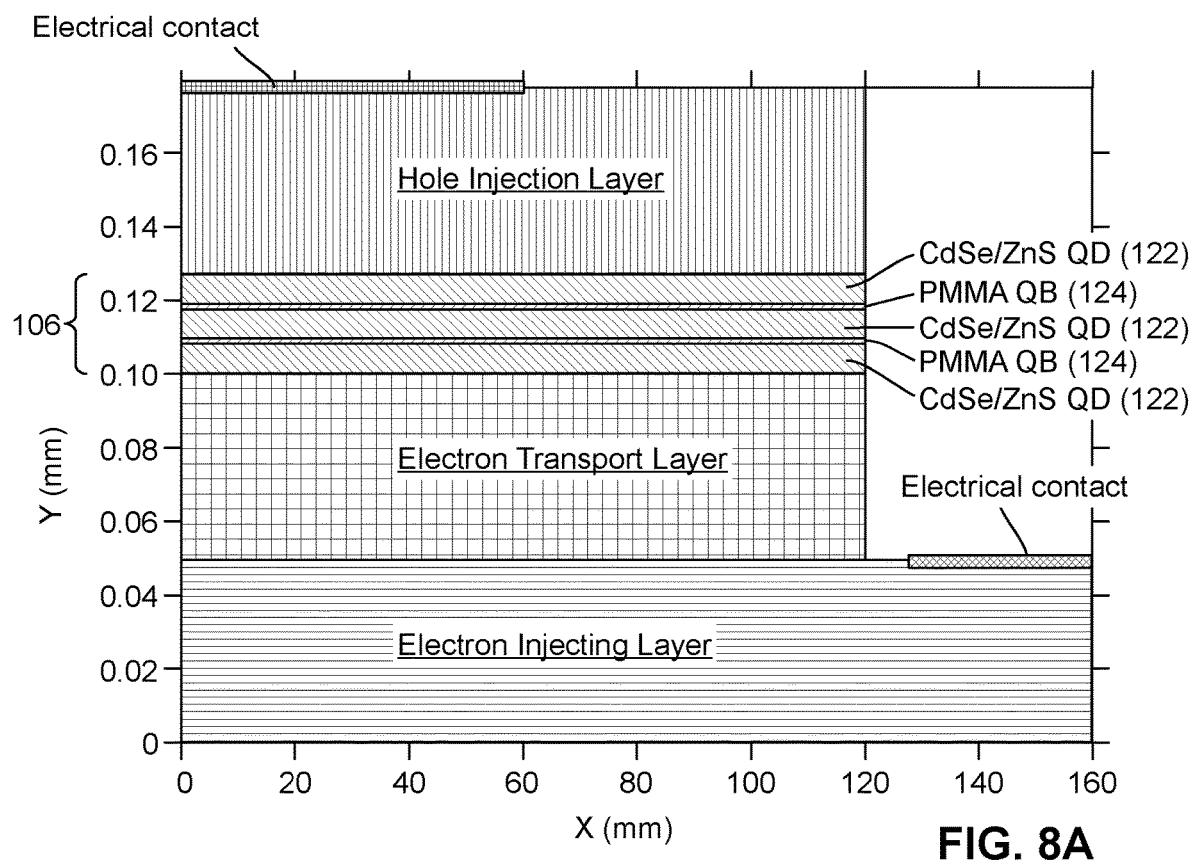
FIG. 8A shows a finite element method (FEM) structure of the multiple-QD-layer QLED device shown in FIG. 2A.

FIG. 8A shows a finite element method (FEM) structure of the multiple-QD-layer QLED device B3 in APSYS. In particular, the FEM structure used in the simulation comprises a 50 nm Hole Injection Layer with number of positive doped particles of about $5 \times 10^{23}$ m$^{-3}$, a 50 nm Electron Injecting Layer with number of negative doped particles of about $5 \times 10^{23}$ m$^{-3}$, an active emission region 106, and a 50 nm Electron Transport Layer. The active emission region 106 comprises three CdSe/ZnS QD layers interleaved with two PMMA QB layers 124. Each CdSe/ZnS QD layer has a thickness of 8 nm, and each PMMA QB layer 124 has a thickness of 1 nm. It is noted that the structure (except the active emission 106) shown in FIG. 8A is used for simulation and is different to that shown in FIG. 3 (which is used for experiments). However, as the testing and analysis below are focused on the active emission region 106, the structure difference outside the active emission region 106 does not significantly affect the testing and analysis results of the active emission region 106.

As a first step, the QD material is defined in APSYS as an embedded material inside a quantum-barrier region, and the properties of the QD material are identified. Next, the structure of the QD layers 122 is defined using a separate sub-project, and the properties of the QD layers 122 are loaded back into the main macroscopic simulation. Quantum levels and optical transition overlaps from microscopic solutions calculated from this part are then imported to the main simulation as input.

After defining the simplified FEM structure of the multiple-QD-layer QLED device 100, the initial state of the simulation is set to the equilibrium state which includes two conditions: (i) there exists no external bias and (ii) the device is under thermal equilibrium. Therefore, the voltage and current on all electrodes are zero.

The scan statement is used by the main simulator engine to activate the equation solver while only the voltage of contacts is changing, and the current is being calculated. This is done by slowly modifying a previously known solution and gradually updating the control variables such as the current. An updated solution is then found using a non-linear Newton algorithm with the previously known solution as the initial guess. After convergence is achieved, the solver continues to update the solution until the defined maximum voltage (3.4 V) has been reached. The voltage of 3.4 V is chosen as the target voltage based on the simulation I-V curve results. The output of the software is visualized by using CrosslightView software.

Figure 8B:
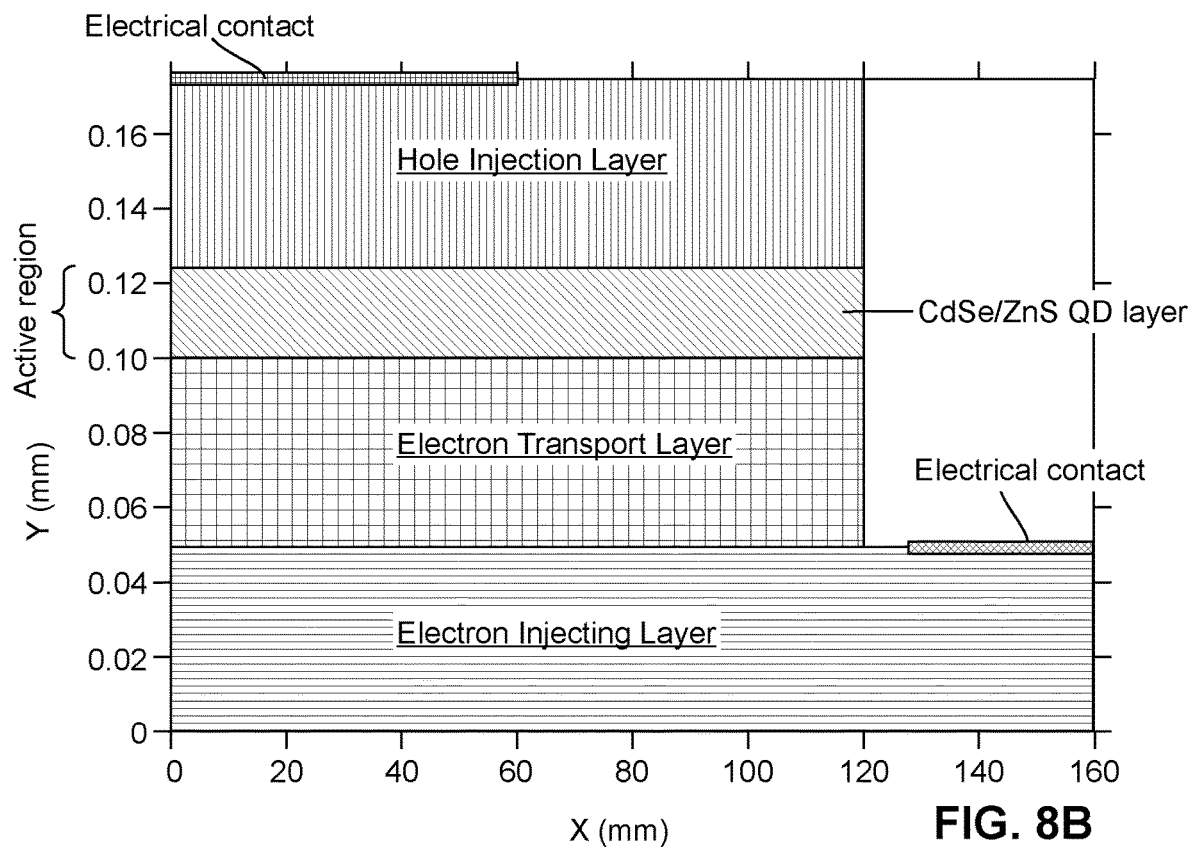
FIG. 8B shows a FEM structure of the conventional QLED device comprises a single CdSe/ZnS QD layer and does not comprise any QB layers.

As a comparison, FIG. 8B shows a FEM structure of the conventional QLED device A3 in APSYS which comprises a single CdSe/ZnS QD layer with a thickness equal to the total thickness of the CdSe/ZnS QD layers 122 of B3 and does not comprise any QB layers.

Figure 9A:
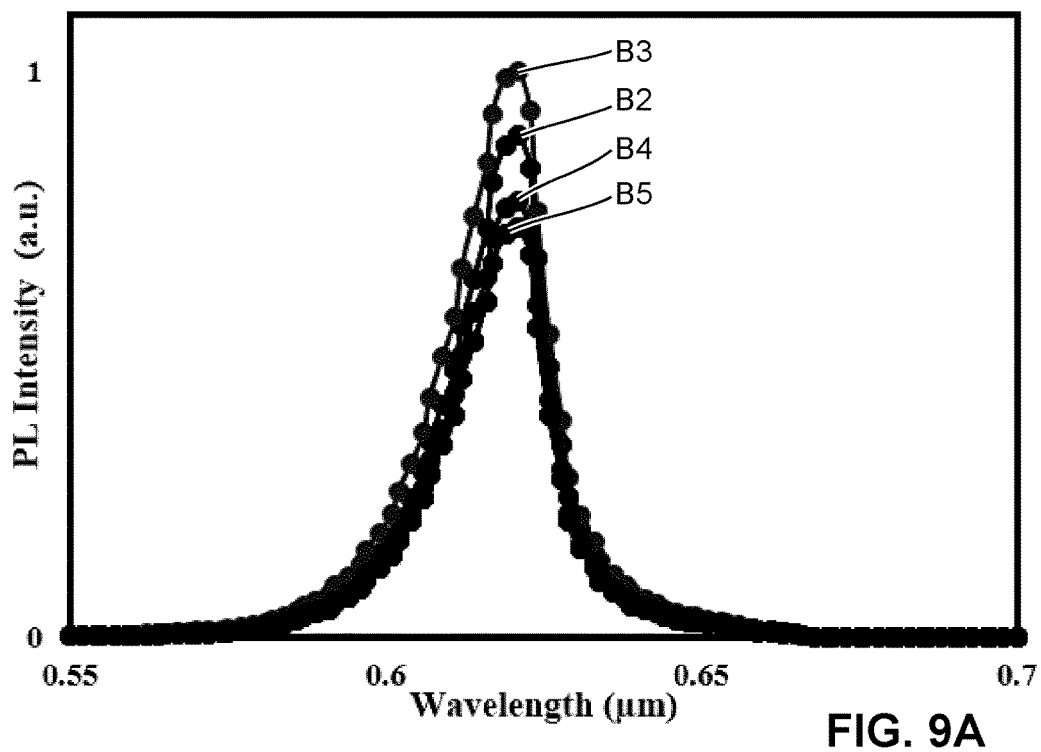
FIG. 9A illustrates the Photoluminescence (PL) intensities of four multiple-QD-layer QLED devices (each as shown in FIG. 2A)

FIG. 9A illustrates the Photoluminescence (PL) intensities of four multiple-QD-layer QLED devices B2, B3, B4, and B5 at 3.4 V. As shown, the multiple-QD-layer QLED device B3 (three QD layers 122 interleaved with two QB layers 124) produces the maximum PL intensity, which is consistent to the experimental results shown in FIG. 7A. While FIG. 7A shows that B4 has a higher power-output peak than B2, FIG. 9A shows that B2 has a higher PL-intensity peak than B4.

Figure 9B:
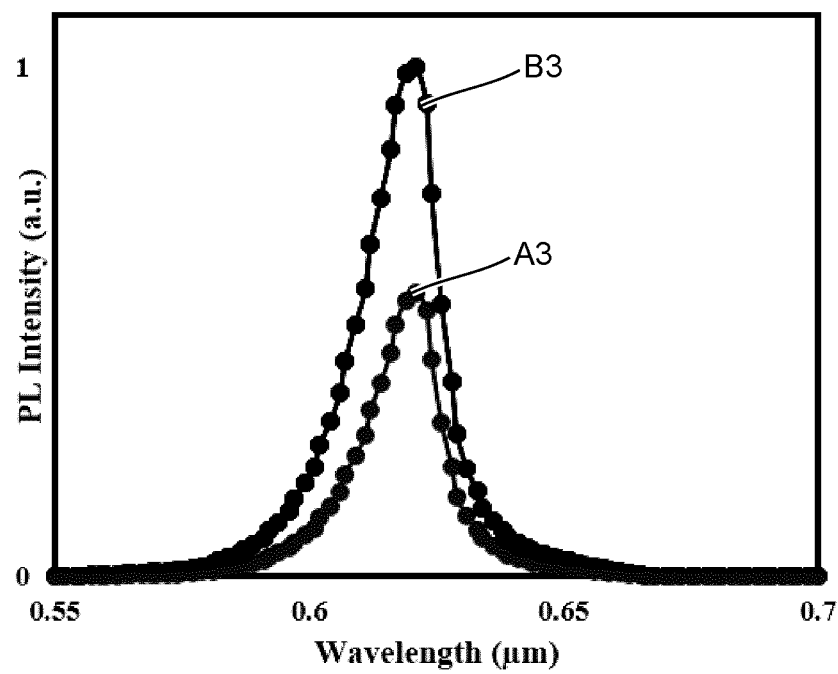
FIG. 9B shows the PL intensities of a multiple-QD-layer QLED device shown in FIG. 2A and a conventional QLED device at 3.4 V.

FIG. 9B shows the PL intensities of a multiple-QD-layer QLED device B3 and a conventional QLED device A3 at 3.4 V. As shown, the multiple-QD-layer QLED device B3 (three QD layers 122 interleaved with two QB layers 124) exhibits a PL-intensity peak about 1.79 times of that of the conventional QLED device A3, which is consistent to the results shown in FIG. 7B.

Figure 9C:
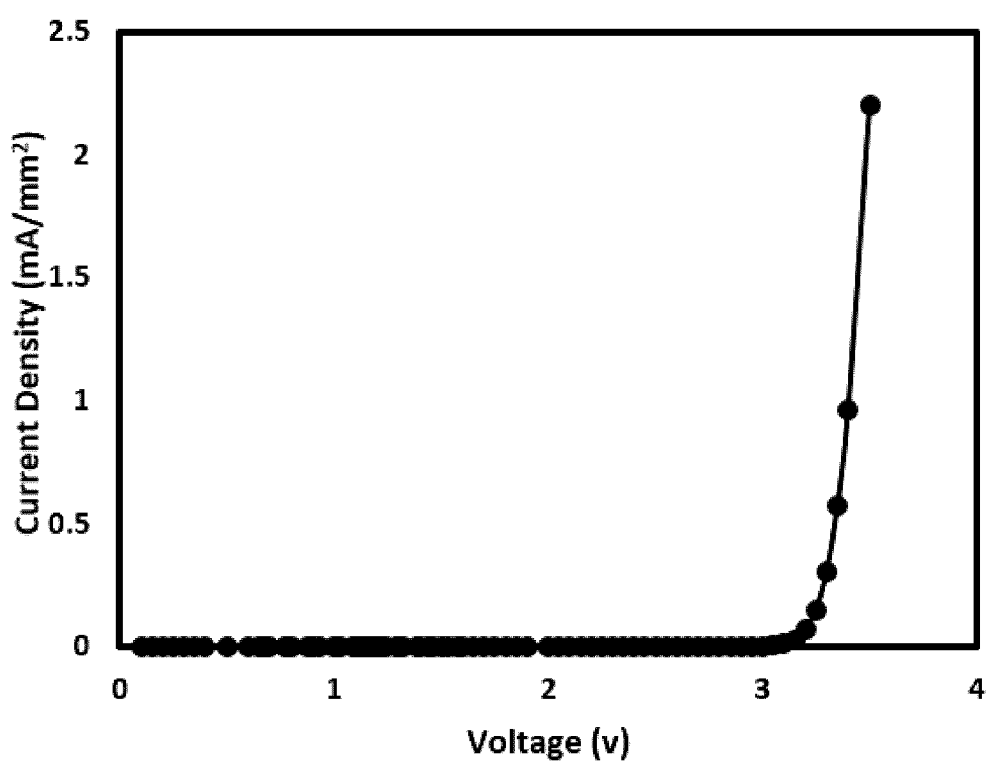
FIG. 9C shows the I-V curve of a multiple-QD-layer QLED device shown in FIG. 2A.

FIG. 9C shows the density-voltage (J-V) characteristics of the multiple-QD-layer QLED device B3. As shown, the operating voltage of the simulated model of B3 is about 3.4 V.

Figure 10:
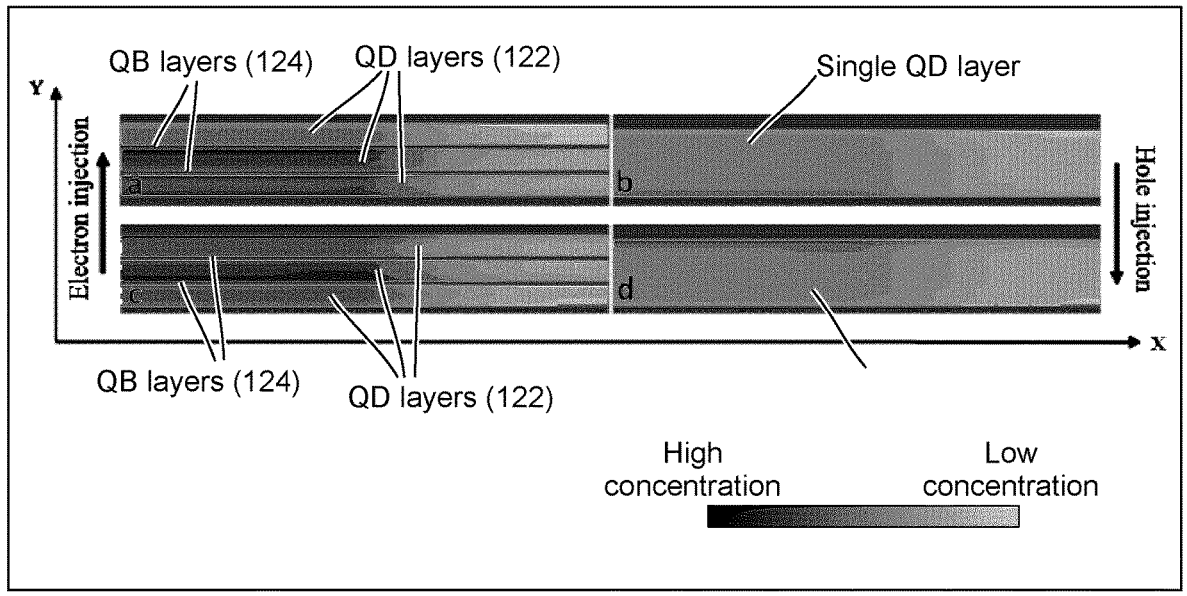
FIG. 10 shows (a) the electron concentration of a multiple-QD-layer QLED device shown in FIG. 2A, (b) the electron concentration of a conventional QLED device (without QB layers), (c) the hole concentration of the multiple-QD-layer QLED device shown in FIG. 2A, and (d) the hole concentration of the conventional QLED device, all obtained from simulation.

FIG. 10 shows (a) the electron concentration of a multiple-QD-layer QLED device 100, (b) the electron concentration of a conventional QLED device (without QB layers), (c) the hole concentration of the multiple-QD-layer QLED device 100, and (d) the hole concentration of the conventional QLED device, all obtained from the APSYS simulation. The thickness of the QD layers in (b) and (d) are equal to the total thickness of the three QD layers in (a) and (c).

The direction of electron/hole injection is indicated with arrows. FIG. 10 is a greyscale image using darkness as the indication of the concentration of electrons (for (a) and (b)) and holes (for (c) and (d)). As shown by the legend of FIG. 10, darker grey represents higher electron/hole concentration and lighter grey represents lower electron/hole concentration.

A comparison of FIG. 10 (a) and (b) shows that the presence of two QB layers 124 greatly increases electron concentration, particularly in the first two QD layers. The same conclusion is observable when comparing FIG. 10 (c) and (d).

Figure 11A:
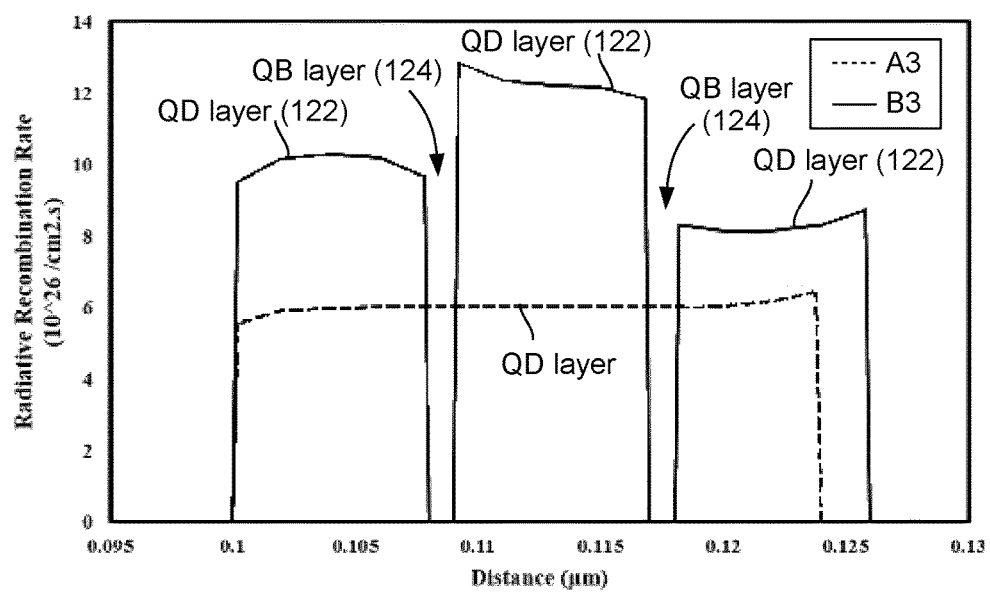
FIG. 11A shows the radiative recombination rates of a multiple-QD-layer QLED device shown in FIG. 2A and a conventional QLED device, respectively.

FIG. 11A shows the radiative recombination rates of a multiple-QD-layer QLED device B3 and a conventional QLED device A3, respectively, relative to location along a hypothetical line passing through the active layer on x=60 μm. As shown, the presence of QB layers 124 in the active emission region 106 results in a higher photon emission rate. The recombination rate calculation was not conducted for layers other than the QD layers 122 for the purpose of simplicity.

Figure 11B:
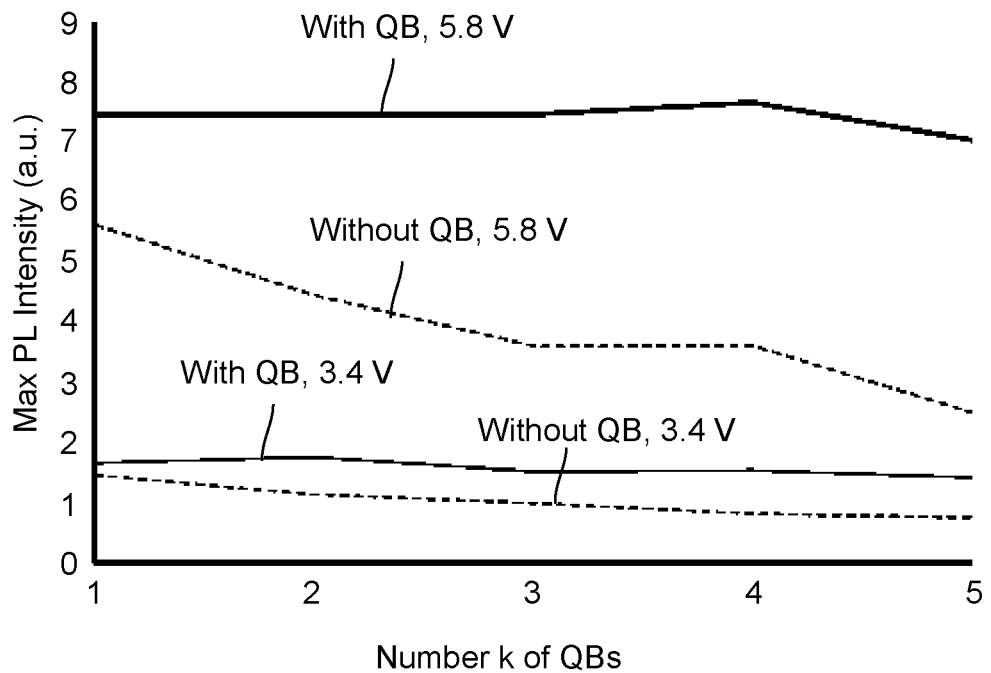
FIG. 11B shows the normalized maximum PL intensities of multiple-QD-layer QLED devices shown in FIG. 2A having different numbers of QB layers and those of conventional QLED devices.

FIG. 11B shows the normalized maximum PL intensities of multiple-QD-layer QLED devices Bn and conventional QLED devices An with n=2, 3, 4, 5, and 6 (i.e., the numbers k of QB layers are k=1, 2, 3, 4, and 5) at different voltages (3.4 V and 5.8 V). Herein, the 3.4 V voltage is determined by the J-V characteristics of the multiple-QD-layer QLED model. As other applications such as lasers may require higher voltages, the 5.8 V voltage is also used in the simulation.

As shown, with the operating voltage of 3.4 V, the presence of QB layers 124 in the multiple-QD-layer QLED devices Bn increases the PL intensity, among which k=2 (i.e., B3 having three QD layers interleaved with two QB layers) gives rise to the largest normalized maximum PL intensity. At higher voltages such as at 5.8 V, the multiple-QD-layer QLED devices Bn also exhibit superior performance in terms of the PL intensities, compared to the conventional QLED devices An. At 5.8 V, k=4 (i.e., B5 having five QD layers interleaved with four QB layers) gives rise to the largest normalized maximum PL intensity. FIG. 11B also shows that the performance difference between the multiple-QD-layer QLED devices Bn and the conventional QLED devices An is greater at higher voltages (e.g., 5.8 V) than at lower voltages (e.g., 3.4 V).

The above experiment results and simulation results show that, with PMMA QB layers interleaved with CdSe/ZnS QD layers, the multiple-QD-layer QLED devices 100 exhibit higher efficiency than conventional QLED devices having a single CdSe/ZnS QD layer and without any QB layers. Compared to conventional QLED devices, the multiple-QD-layer QLED devices 100 has a lower rate of electron leakage which leads to a higher rate of radiative recombination. The multiple-QD-layer QLED device B3 having interleaved three QD layers 122 (each with a thickness of about 25 nm) and two QB layers 124 (each with a thickness of about 3 nm) may be an optimized device with a current efficiency of 19 cd/A and a luminescent of 207,000 Cd/m².

Further simulation/experiment results are presented in FIGS. 12 to 21.

Figure 12:
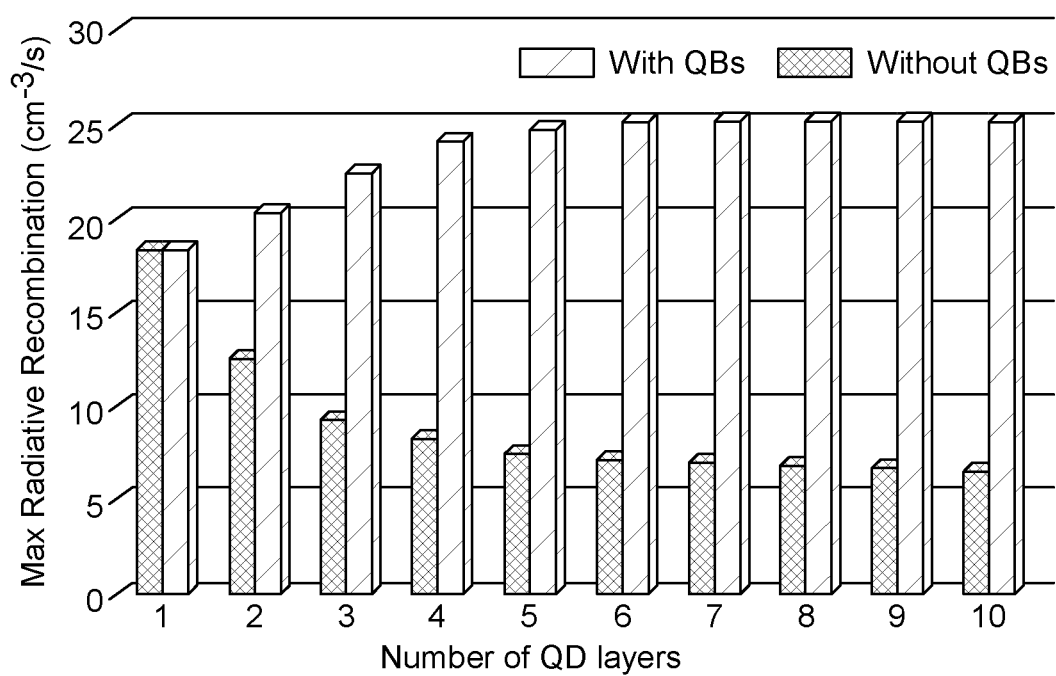
FIG. 12 shows the maximum radiative recombination rates of multiple-QD-layer QLED devices shown in FIG. 2A with different numbers of QD layers.

FIG. 12 shows the maximum radiative recombination rates of multiple-QD-layer QLED devices 100 with different numbers n of QD layers 122 and conventional QLED devices at 5.8 V, where the results of multiple-QD-layer QLED devices 100 are obtained by neglecting the auger recombination and non-radiative recombination. In other words, FIG. 12 shows the simulation results of maximum radiative recombination rates of ideal multiple-QD-layer QLED devices 100 in which the QB layers have no defect. Moreover, when n=1, the multiple-QD-layer QLED device 100 is effectively equivalent to a conventional QLED device that has a single (thin) QD layer and without any QB layers.

With the number n of QD layers 122 increasing, the maximum radiative recombination rate of the multiple-QD-layer QLED device 100 increases. When the number of QD layers 122 to five (5) layers, the maximum radiative recombination rate reaches an upper bound and further increasing the number n of QD layers would not lead to further increase of the maximum radiative recombination rate.

On the other hand, with the increase of the thickness of the single QD layer (i.e., with the increase of n), maximum radiative recombination rate of the conventional QLED device decreases.

Figure 13:
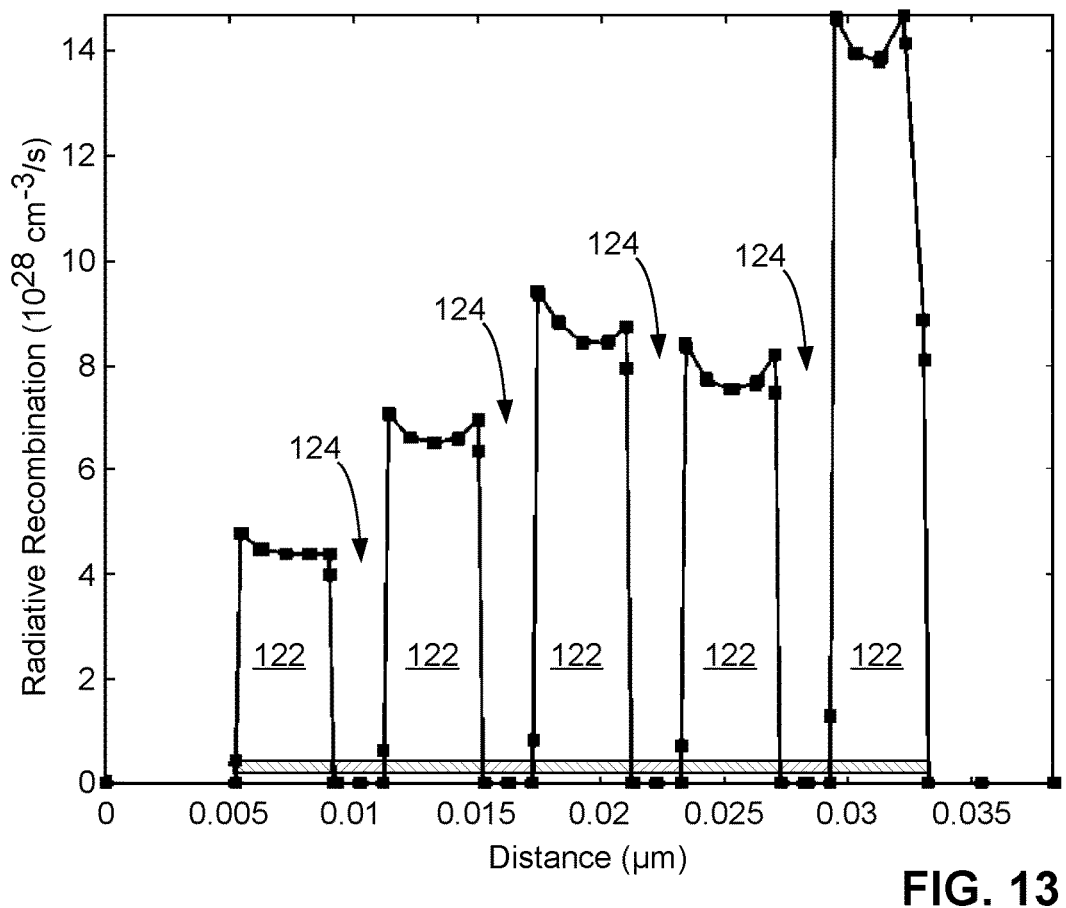
FIG. 13 shows the radiative recombination in each QD layer of a multiple-QD-layer QLED device shown in FIG. 2A having five QD layers interleaved with four QB layers.
Figure 14:
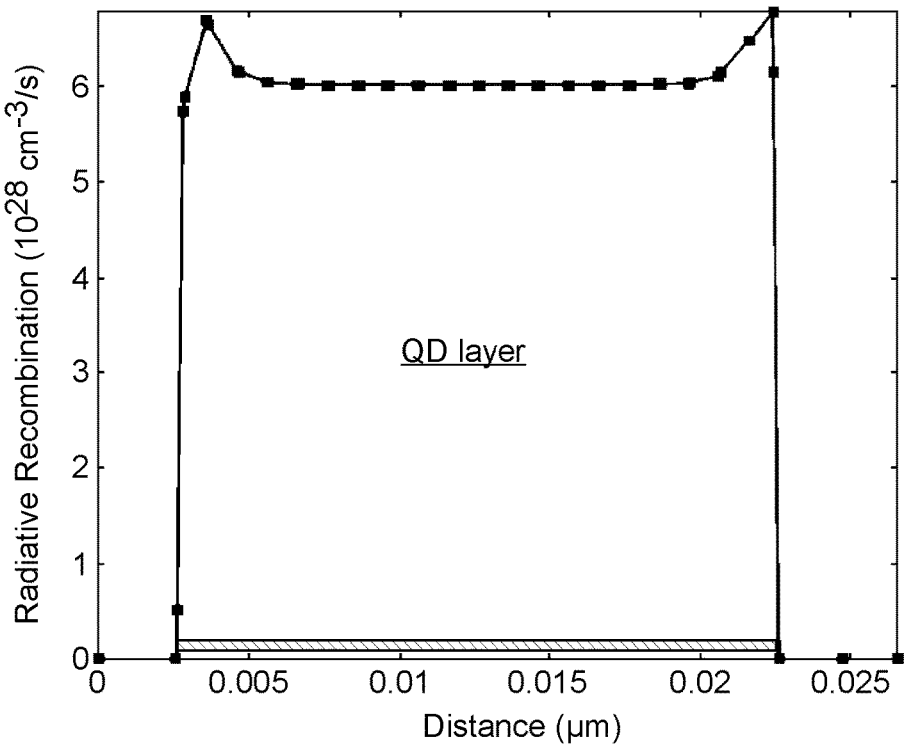
FIG. 14 shows the radiative recombination in the QD layer of a conventional QLED device having a single QD layer and without any QB layers.

FIG. 13 shows the radiative recombination in each QD layer 122 of a multiple-QD-layer QLED device 100 having five QD layers 122 interleaved with four QB layers 124. As a comparison, FIG. 14 shows the radiative recombination in the QD layer of a conventional QLED device having a single QD layer and without any QB layers.

Figure 15A:
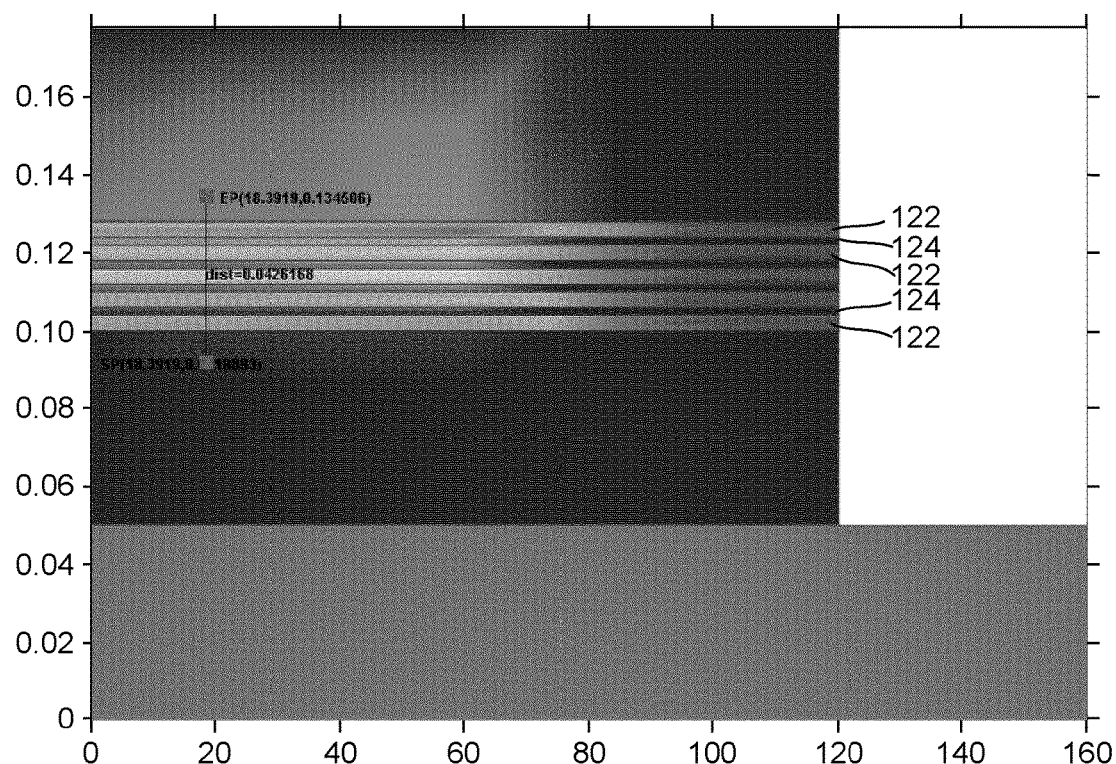
FIGS. 15A and 15B show the concentration of electrons in each QD layer of a multiple-QD-layer QLED device shown in FIG. 2A having five QD layers interleaved with four QB layers.
Figure 15B:
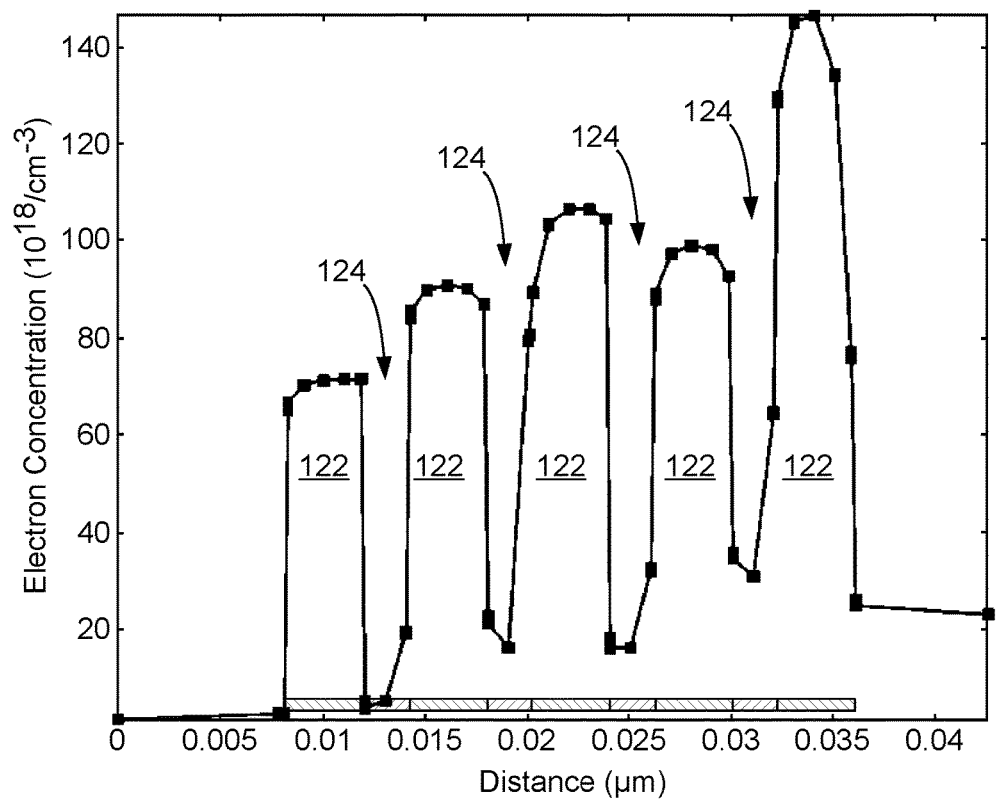
Figure 16A:
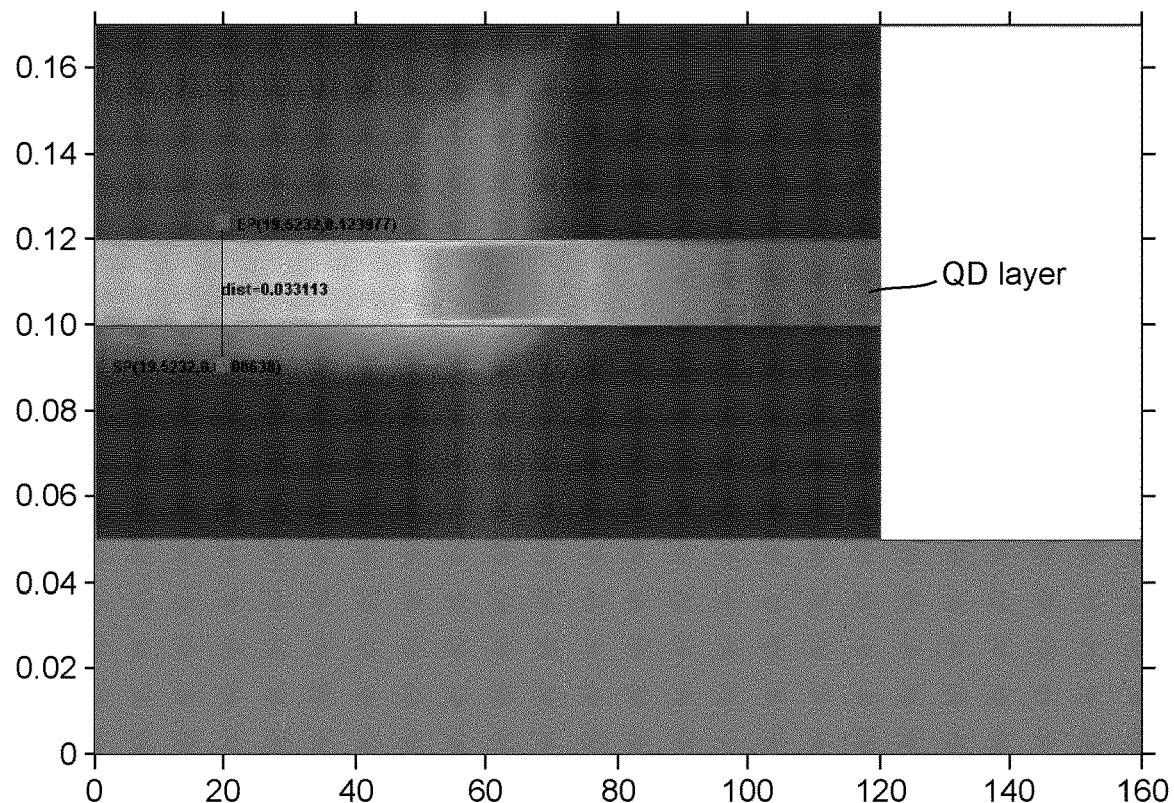
FIGS. 16A and 16B show the concentration of electrons in the QD layer of a conventional QLED device having a single QD layer and without any QB layers.
Figure 16B:
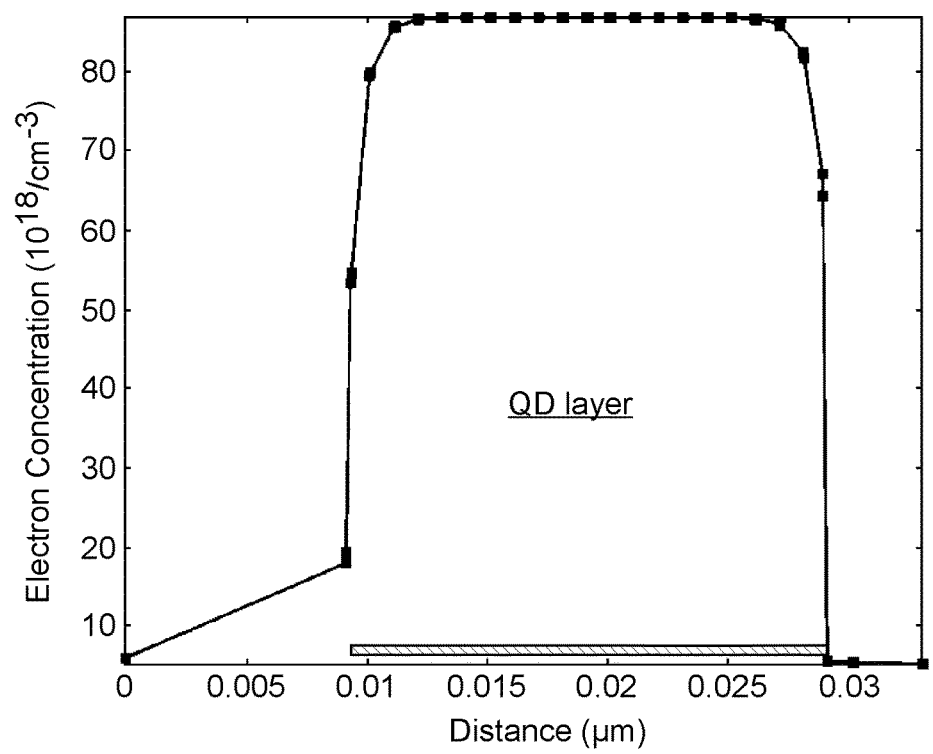

FIGS. 15A and 15B show the concentration of electrons in each QD layer 122 of a multiple-QD-layer QLED device 100 having five QD layers 122 interleaved with four QB layers 124. As a comparison, FIGS. 16A and 16B show the concentration of electrons in the QD layer of a conventional QLED device having a single QD layer and without any QB layers.

Figure 17:
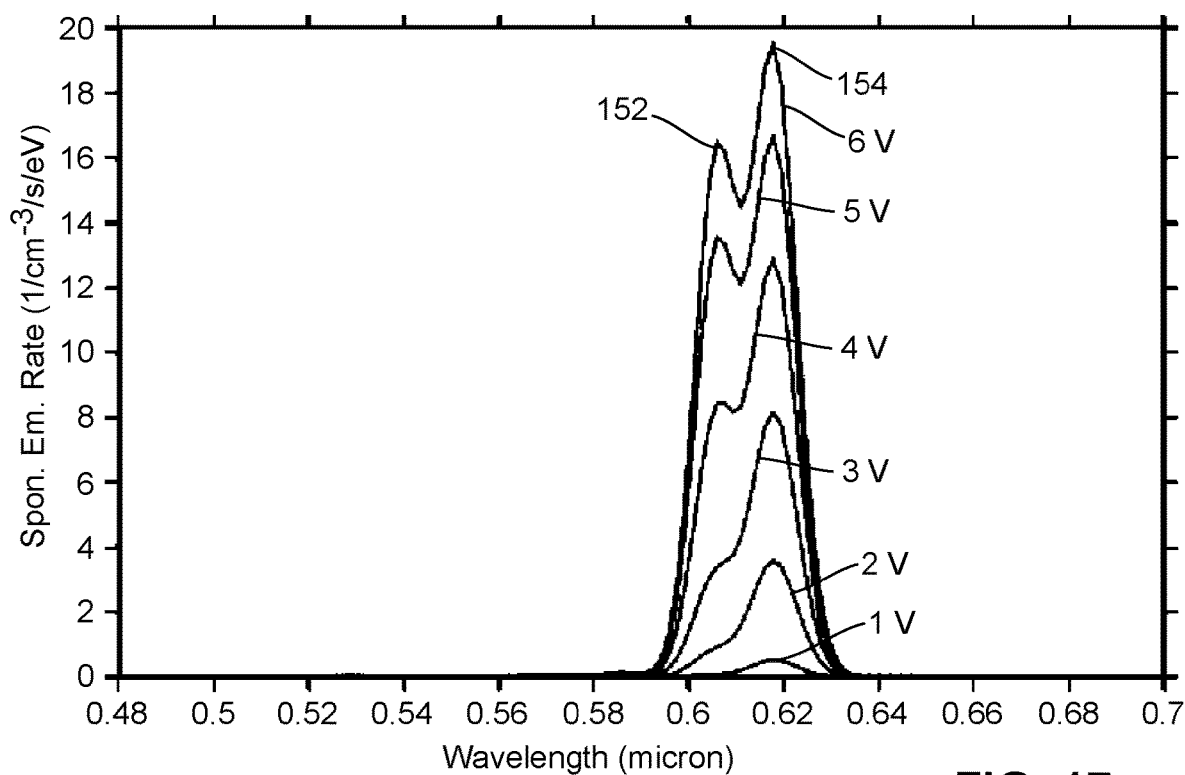
FIG. 17 shows the spontaneous emission rate versus wavelength in of a multiple-QD-layer QLED device shown in FIG. 2A at various operating voltages (1 V to 6 V)

FIG. 17 shows the spontaneous emission rate versus wavelength of a multiple-QD-layer QLED device 100 at various operating voltages (1 V to 6 V), wherein the spontaneous emission is also called luminescence and is the process in which a quantum mechanical system transitions from an excited-energy state to a lower-energy state and emits an energy in the form of a photon. In FIG. 17, the first peak 152 occurs because of the existence of QB layers 124 and the second peak 154 is related to quantum dots. Moreover, it can be seen that the light emission peak increases with the increase of the operating voltage from 1 V to 6 V.

Figure 18:
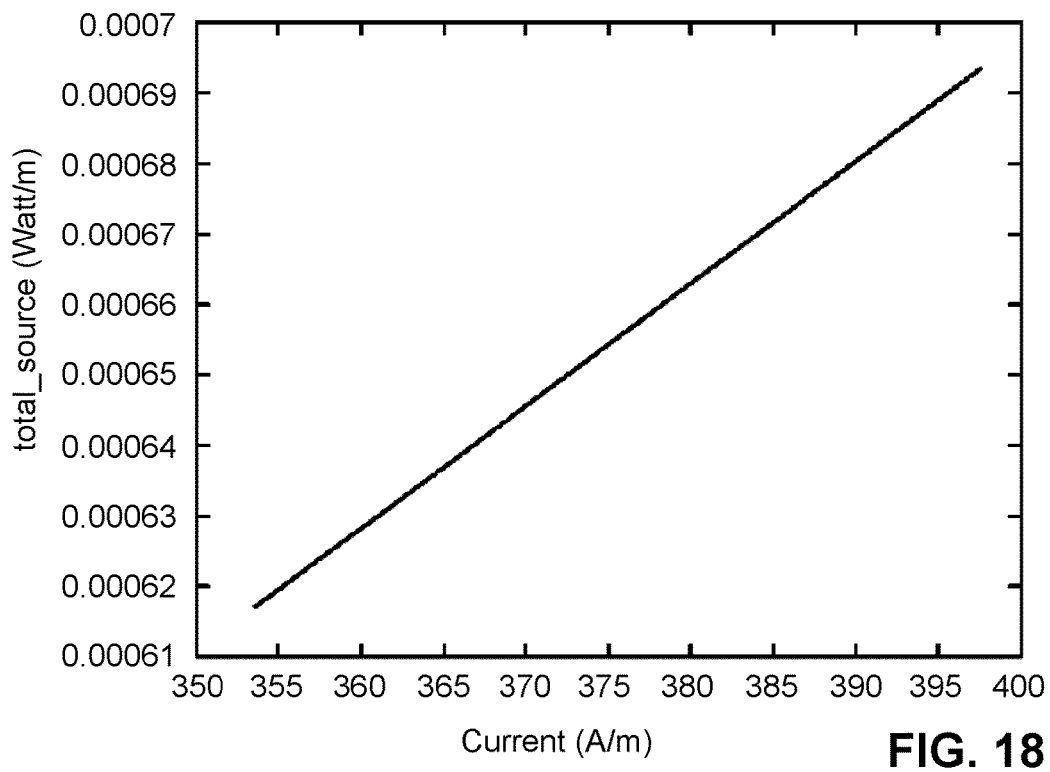
FIG. 18 shows the total energy produced by the multiple-QD-layer QLED device shown in FIG. 2A versus the current intensity.

FIG. 18 shows the total energy produced by the multiple-QD-layer QLED device 100 versus the current intensity. FIG. 18 shows that there is a linear trend between the total energy and the current.

Figure 19:
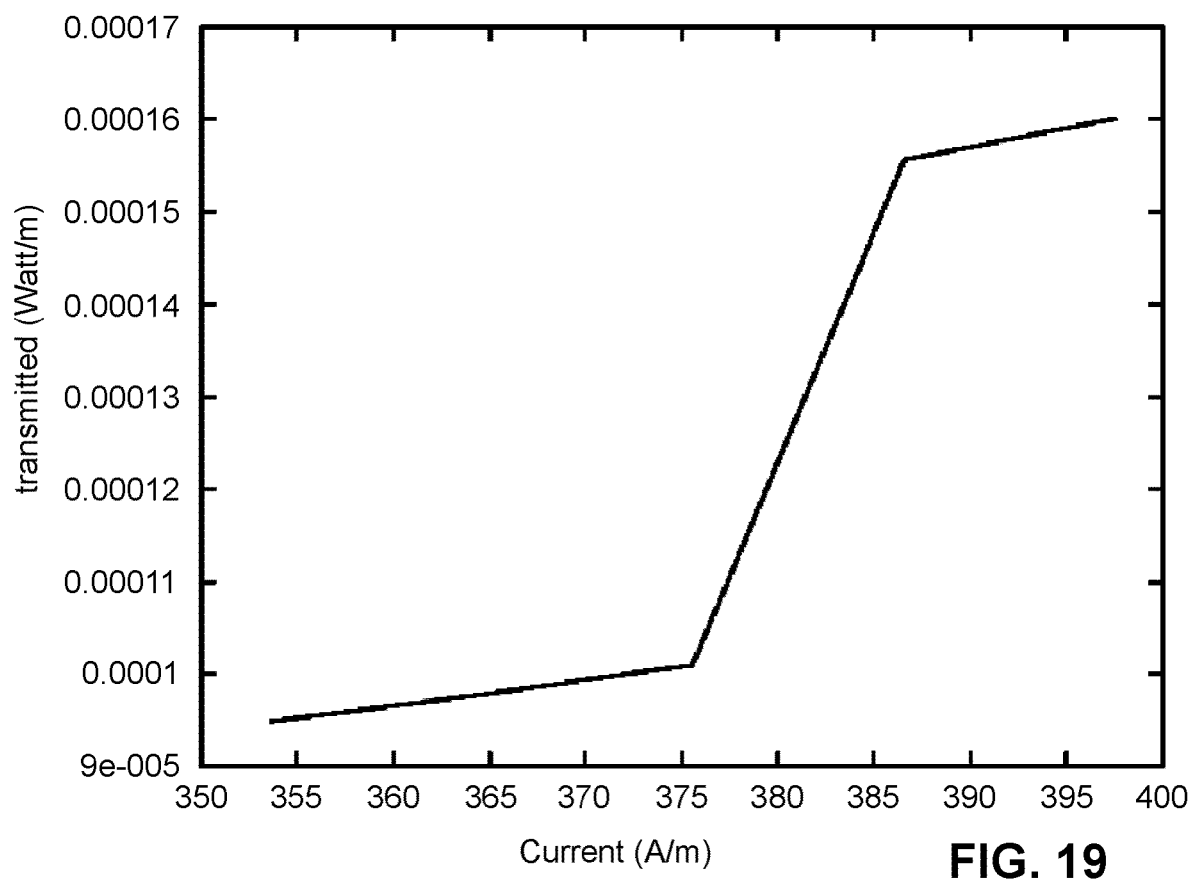
FIG. 19 shows the transmitted photons versus the current of a multiple-QD-layer QLED device shown in FIG. 2A.

FIG. 19 shows the transmitted photons versus the current of a multiple-QD-layer QLED device 100. Two factors determine the amount of energy the photon transmits, including the initial energy of the photon and its angle of deflection. Each photon carries a specific energy related to its wavelength. Therefore, photons of short wavelength carry more energy than those of long wavelength. Also, based on the type of radiative recombination (direct recombination, Shockley-Read-Hall (SRH) recombination, or Auger recombination), transmitted photons change with the current density.

Figure 20:
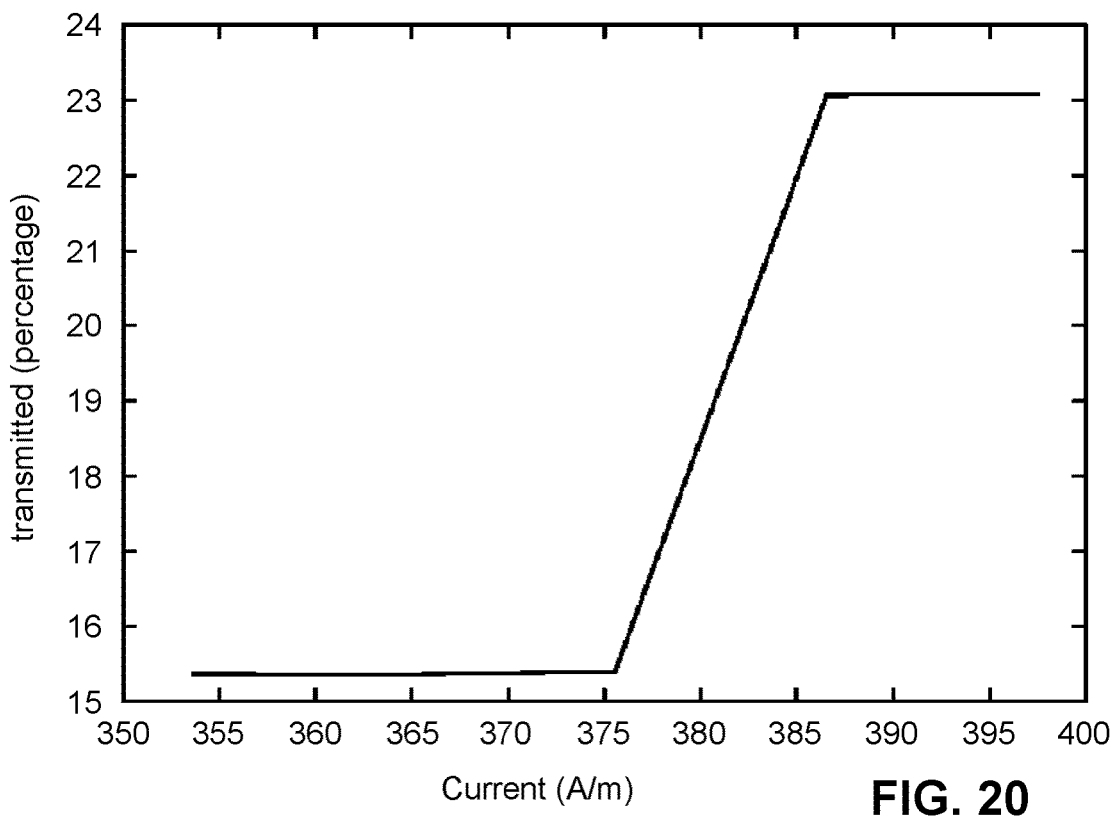
FIG. 20 shows the percentage of transmitted photons versus the current density of a multiple-QD-layer QLED device shown in FIG. 2A.

FIG. 20 shows the percentage of transmitted photons versus the current density of a multiple-QD-layer QLED device 100. FIG. 20 shows that highest percentage of transmitted photons in a multiple-QD-layer QLED 100 using CdSe/ZnS as the QD layers can be observed at 385 A/m.

Figure 21:
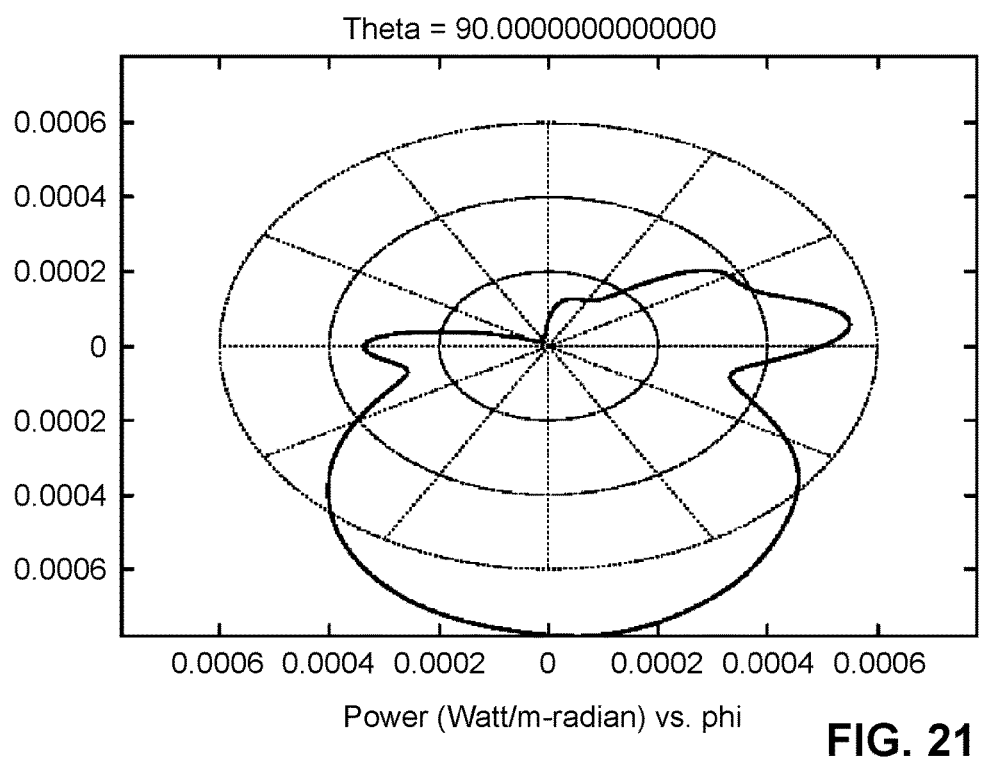
FIG. 21 shows the emission/radiation pattern of a multiple-QD-layer QLED device shown in FIG. 2A.

FIG. 21 shows the emission/radiation pattern of a multiple-QD-layer QLED device 100. As shown, the multiple-QD-layer QLED device 100 is substantively a directional light source with the maximum emitted power in the direction perpendicular to the emitting surface. The radiation pattern shown in FIG. 21 indicates that most of the energy is emitted within 20° of the direction of maximum light without using packages such as plastic lenses to spread or focus the light for a specific angle of visibility.

Alternative Structure of the QLED Device

In above embodiments, the QLED 100 comprises a HTL 108 adjacent the active emission region 106 for preventing the non-radiative recombination of holes and electrons that may otherwise occur at the interface of the active emission region 106 and the HIL 110.

Figure 22A:
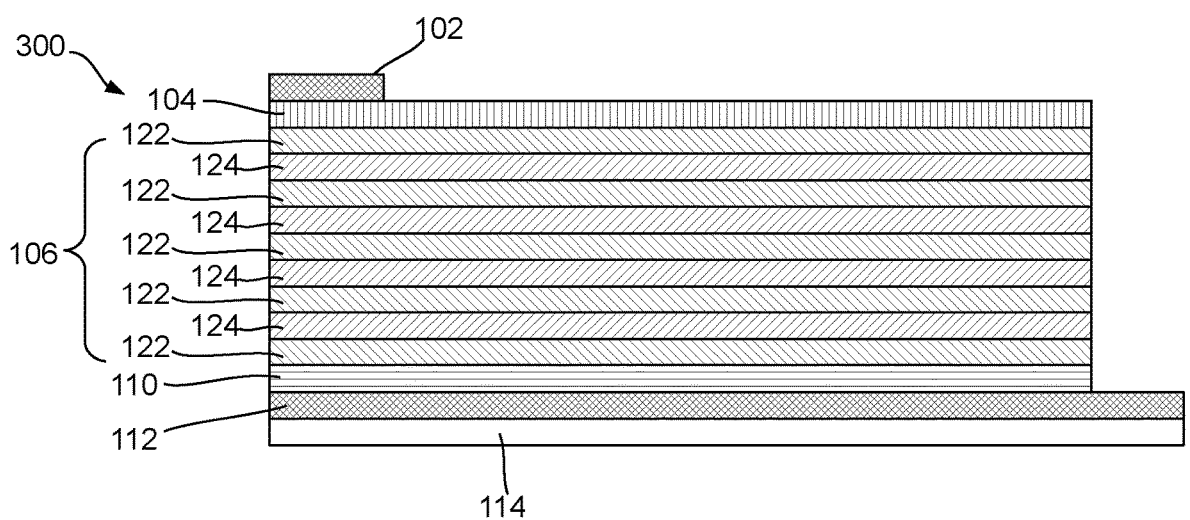
FIGS. 22A and 22B show the structure of a multiple-QD-layer QLED device, according to some alternative embodiments of this disclosure.
Figure 22B:
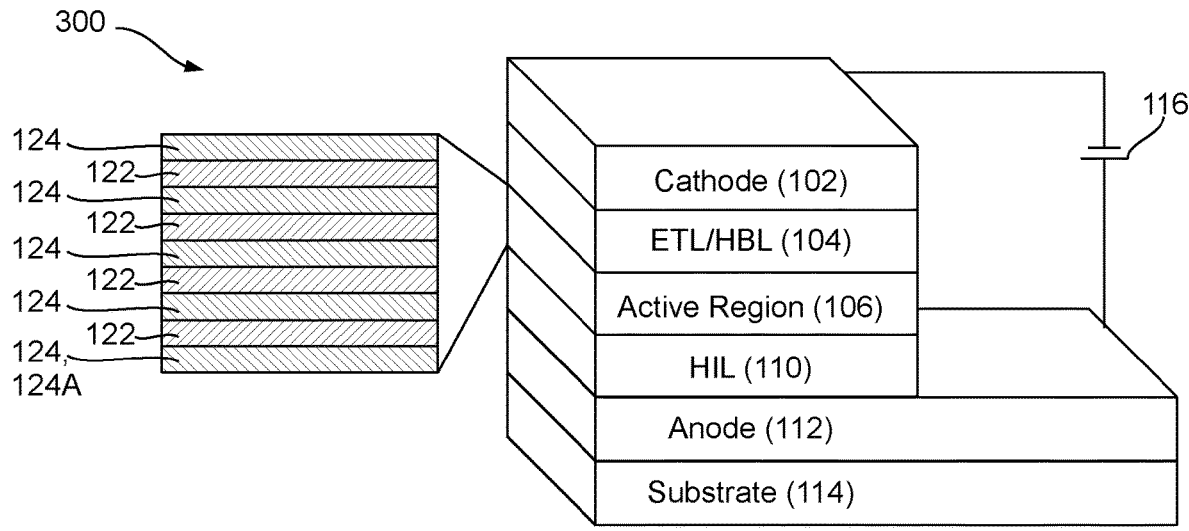
Figure 23A:
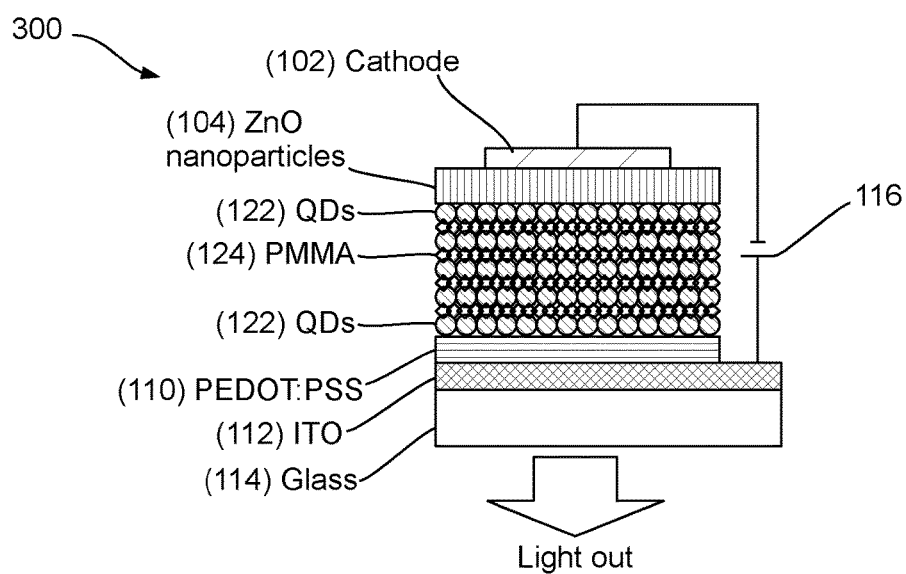
FIG. 23A shows the structure of the multiple-QD-layer QLED device shown in FIG. 22A used in a simulation in these embodiments.
Figure 23B:
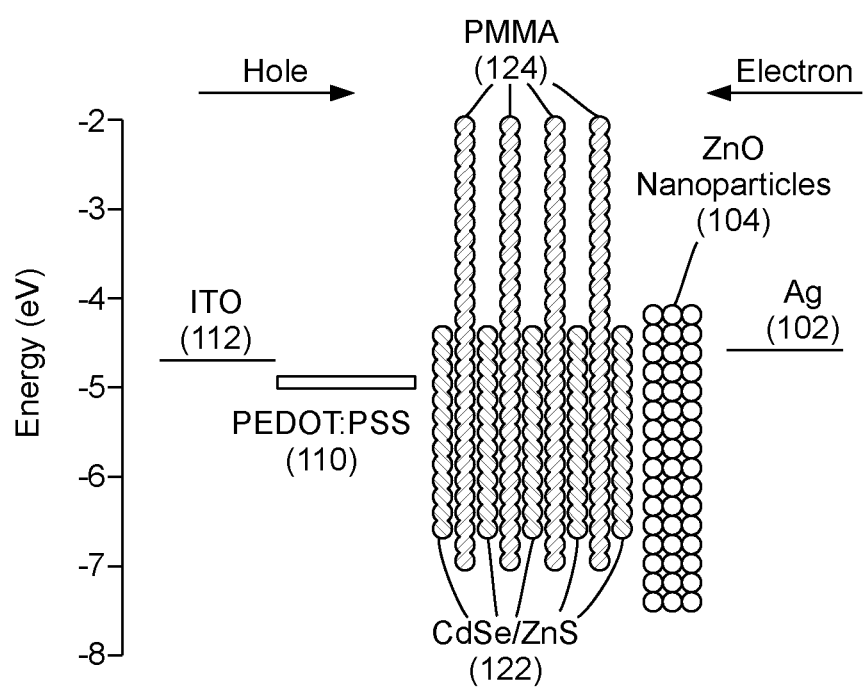
FIG. 23B shows the energy level diagram for the layers of the multiple-QD-layer QLED device shown in FIG. 22A.

In some alternative embodiments, the QLED may not comprise any HTL. FIGS. 22A and 22B show the structure of a QLED 300 in these embodiments. FIG. 23A shows the structure of the multiple-QD-layer QLED device 300 used in a simulation in these embodiments, and FIG. 23B shows the energy level diagram for the layers of the multiple-QD-layer QLED device 300.

As shown, the active emission region 106 is sandwiched between an ETL/HBL 104 and a HIL 110. The active emission region 106 is directly coupled to the HIL 110.

Similar to the embodiments shown in FIGS. 2A and 2B, the active emission region 106 in these embodiments comprises n QD layers interleaved with (n−1) QB layers where n is a positive integer greater than one such that each QB layers 124 is sandwiched between a pair of adjacent QD layers 122.

Those skilled in the art will appreciate that in various embodiments, the QLED device 100 or 300 may be manufactured by using any suitable methods for example, coating, nanoparticle deposition (such as radio frequency (RF) deposition, thermal evaporation deposition or chemical vapor deposition (CVD) method), and/or the like.

In some alternative embodiments, the above-described multilayer design and architecture may be applied to some organic light-emitting diodes (OLEDs) for improving the efficiency thereof When using the above-described multilayer architecture, it may be important to select a suitable type of solvents to ensure that the previous layers would not be washed off by PMMA dissolved in acetone.

In some alternative embodiments, the above-described multilayer design and architecture may be further deployed for fabrication of white QLEDs by coating colored (blue/green/red) QD layers between QB layers.

Although embodiments have been described above with reference to the accompanying drawings, those of skill in the art will appreciate that variations and modifications may be made without departing from the scope thereof as defined by the appended claims.

ACRONYMS

3D: three-dimensional
Ag: Silver
Al: Aluminum
CBP: 4,4'-bis(carbazol-9-yl)biphenyl
CdSe: Cadmium Selenide
CdSe/ZnS: Cadmium Selenide/Zinc Sulfide
CIE: Commission Internationale de l'Elcairage
CRI: color rendering index
CVD: chemical vapor deposition
DC: Direct Current
EBL: electron-blocking layer
EL: electroluminescence
ETL: electron-transport layer
eV: electronvolt
FEM: finite element method
FWHM: full width at half maximum
g: gram
HBL: hole-blocking layer
HIL: hole-injection layer
HTL: hole-transport layer
IQE: internal quantum efficiency
ITO: Indium Tin Oxide
LED: light-emitting diode
LUMO: lowest unoccupied molecular orbital
ml: milliliter
NIR: near infrared
nm: nanometer
NPB: N,N'-diphenyl-N,N'-bis(1-naphthyl-phenyl)-(1,1'-biphenyl)-4,4'-diamine
OLED: organic light-emitting diode
PEDOT:PSS: poly(3,4-ethylenedioxythiophene) polystyrene sulfonate
PEIE: polyethylenimine ethoxylated
PL: Photoluminescence
PMMA: Poly(methyl methacrylate)
Poly-TPD: Poly[N,N'-bis(4-butylphenyl)-N,N'-bisphenylbenzidine]
PVDF: Polyvinylidene difluoride
PVK: poly(9-vinlycarbazole)
QB: quantum-barrier
QD: quantum dot
QLED: quantum-dot light-emitting diode
QY: quantum yield
RF: radio frequency
RO: reverse osmosis
SEM: scanning electron microscope
SRH: Shockley-Read-Hall
TAPC: 4,4'-Cyclohexylidenebis[N,N-bis(4-methylphenyl)benzenamine]
TCTA: 4,4',4"-tri(N-carbazolyl)triphenylamine
UV: ultraviolet
V: volts
ZnO: Zinc Oxide
ZnS: Zinc Sulfide

REFERENCES

[1] P. Reiss, J. Bleuse, and A. Pron, "Highly Luminescent CdSe/ZnSe Core/Shell Nanocrystals of Low Size Dispersion," Nano Lett., vol. 2, no. 7, pp. 781-784, 2002.

[2] P. O. Anikeena, J. E. Halpert, M. G. Bawendi, and V. Bulovic, "Quantum Dot Light-Emitting Devices with Electroluminescence Tunabe over the Entire Visibe Spectrum," Nano Lett., vol. 9, pp. 2532-2536, 2009.

[3] J. J. Li et al., "Large-scale synthesis of nearly monodisperse CdSe/CdS core/shell nanocrystals using air-stable reagents via successive ion layer adsorption and reaction," J. Am. Chem. Soc., vol. 125, no. 41, pp. 12567-12575, 2003.

[4] F. Chen et al., "Enhanced Performance of Quantum Dot-Based Light-Emitting Diodes with Gold Nanoparticle-Doped Hole Injection Layer," Nanoscale Res. Lett., vol. 11, no. 1, 2016.

[5] Q. Huang et al., "High-performance quantum dot light-emitting diodes with hybrid hole transport layer via doping engineering," Opt. Express, vol. 24, no. 23, p. 25955, 2016.

[6] X. Yang et al., "Highly flexible, electrically driven, top-emitting, quantum dot light-emitting stickers," ACS Nano, vol. 8, no. 8, pp. 8224-8231, 2014.

[7] X. I. A. O. J. In et al., "Efficient light-emitting diodes based on reverse type-I quantum dots," vol. 7, no. 12, pp. 9297-9305, 2017.

[8] S. Baskoutas and A. F. Terzis, "Size-dependent band gap of colloidal quantum dots," J. Appl. Phys., vol. 99, no. 1, 2006.

[9] N. Chestnoy, T. D. Harris, R. Hull, and L. E. Brus, "Luminescence and photophysics of cadmium sulfide semiconductor clusters: the nature of the emitting electronic state," J. Phys. Chem., vol. 90, no. 15, pp. 3393-3399, 1986.

[10] C. B. Murray, C. R. Kagan, and M. G. Bawendi, "Synthesis and Characterization of Monodisperse Nanocrystals and Close-Packed Nanocrystal Assemblies," Annu. Rev. Mater. Sci., vol. 30, no. 1, pp. 545-610, 2000.

[11] H. Zhang et al., "Ultrastable Quantum-Dot Light-Emitting Diodes by Suppression of Leakage Current and Exciton Quenching Processes," ACS Appl. Mater. Interfaces, vol. 8, no. 45, pp. 31385-31391, 2016.

[12] J. Piprek, F. Römer, and B. Witzigmann, "On the uncertainty of the Auger recombination coefficient extracted from InGaN/GaN light-emitting diode efficiency droop measurements," Appl. Phys. Lett., vol. 106, no. 10, 2015.

[13] B. Zhu et al., "Low turn-on voltage and highly bright Ag—In—Zn—S quantum dot light-emitting diodes," J. Mater. Chem. C, vol. 6, no. 17, pp. 4683-4690, 2018.

[14] K. Qasim et al., "Large-Area Quantum-Dot Light Emitting Diode Arrays with ZnO Nanoparticles as Electron Transport/Injection Layer," Sci. Adv. Mater., vol. 6, no. 12, pp. 2625-2631, 2014.

[15] J. Pan, J. Chen, Q. Huang, L. Wang, and W. Lei, "A highly efficient quantum dot light emitting diode: Via improving the carrier balance by modulating the hole transport," RSC Adv., vol. 7, no. 69, pp. 43366-43372, 2017.

[16] X. Dai et al., "Solution-processed, high-performance light-emitting diodes based on quantum dots," Nature, vol. 515, no. 7525, pp. 96-99, 2014.

[17] Q. Zhang et al., "Enhancing extraction efficiency of quantum dot light-emitting diodes by surface engineering," Opt. Express, vol. 25, no. 15, p. 17683, 2017.

[18] Y. Dong et al., "20.2: Ultra-Bright, Highly Efficient, Low Roll-Off Inverted Quantum-Dot Light Emitting Devices (QLEDs)," SID Symp. Dig. Tech. Pap., vol. 46, no. 1, pp. 270-273, 2015.

[19] H. H. Kim et al., "Inverted quantum dot light emitting diodes using polyethylenimine ethoxylated modified ZnO," Sci. Rep., vol. 5, pp. 1-5, 2015.

[20] Y. Jiang, H. Tang, S. Chen, and H. Kwok, "Optimizing the Balance of Holes and Electrons in Inverted Quantum Dot Light-Emitting Diodes by Inserting Electron Transportation Barrier Layer," SID Tec. Dig., pp. 274-277, 2015.

[21] G. F. Yang et al., "InGaN/GaN multiple quantum wells on selectively grown GaN microfacets and the applications for phosphor-free white light-emitting diodes," Rev. Phys., vol. 1, no. 1800, pp. 101-119, 2016.

[22] I. Al-Deen Hussein Ali Al-Saidi and R. Jabar, "Investigation of Optical Properties of Solochrome Dark Blue Dye Doped Polymer Films," J. Mater. Phys. Chem., vol. 5, no. 1, pp. 32-38, 2017.

[23] D. I. Son, C. H. You, J. H. Jung, and T. W. Kim, "Carrier transport mechanisms of organic bistable devices fabricated utilizing colloidal ZnO quantum dot-polymethylmethacrylate polymer nanocomposites," Appl. Phys. Lett., vol. 97, no. 1, pp. 1-4, 2010.

[24] C. Pacholski, A. Kornowski, and H. Weller, "Self-assembly of ZnO: From nanodots to nanorods," Angew. Chemie-Int. Ed., vol. 41, no. 7, pp. 1188-1191, 2002.

[25] E. A. Meulenkamp, "Synthesis and Growth of ZnO Nanoparticles," J. Phys. Chem. B, vol. 102, no. 29, pp. 5566-5572, 1998.

[26] S. Dayneko et al., "Effect of surface ligands on the performance of organic light-emitting diodes containing quantum dots," Proc. SPIE Vol. 9270, vol. 103, no. 6, p. 927009, 2014.

[27] S. R. Forrest, D. D. C. Bradley, and M. E. Thompson, "Measuring the Efficiency of Organic Light-Emitting Devices," Adv. Mater., vol. 15, no. 13, pp. 1043-1048, 2003.

[28] Z. Li et al., "A low-work-function, high-conductivity PEDOT:PSS electrode for organic solar cells with a simple structure," Synth. Met., vol. 210, pp. 363-366, 2015.

[29] U. Wurfel, A. Cuevas, and P. Wurfel, "Charge carrier separation in solar cells," IEEE J. Photovoltaics, vol. 5, no. 1, pp. 461-469, 2015.

[30] S. S. Lo, L. Yang, and C. P. Chiu, "ZnO/poly(N-vinylcarbazole) coaxial nanocables for white-light emissions," J. Mater. Chem. C, vol. 3, no. 3, pp. 686-692, 2015.

[31] F. Meng et al., "An organic-inorganic hybrid UV photodetector based on a TiO2 nanobowl array with high spectrum selectivity," RSC Adv., vol. 3, no. 44, pp. 21413-21417, 2013.

[32] V. L. Colvin, M. C. Schlamp, and A. P. Alivisatos, "Light-emitting diodes made from cadmium selenide nanocrystals and a semiconducting polymer," Nature, vol. 370, no. 6488, pp. 354-357, 1994.

[33] M. K. Choi, J. Yang, T. Hyeon, and D.-H. Kim, "Flexible quantum dot light-emitting diodes for next-generation displays," npj Flex. Electron., vol. 2, no. 1, p. 10, 2018.

[34] B. O. Dabbousi et al., "(CdSe)ZnS Core-Shell Quantum Dots: Synthesis and Characterization of a Size Series of Highly Luminescent Nanocrystallites," J. Phys. Chem. B, vol. 101, no. 46, pp. 9463-9475, 1997.

[35] M. Mehrjoo, M. Molaei, and M. Karimipour, "A novel process for synthesis of CdSe/ZnS core-shell QDs and their application for the Methyl orange (MO) degradation," Mater. Chem. Phys., vol. 201, pp. 165-169, 2017.

[36] D. V. Talapin, A. L. Rogach, A. Kornowski, M. Haase, and H. Weller, "Highly Luminescent Monodisperse CdSe and CdSe/ZnS Nanocrystals Synthesized in a Hexadecylamine-Trioctylphosphine Oxide-Trioctylphospine Mixture," Nano Lett., vol. 1, no. 4, pp. 207-211, 2001.

[37] L. Qian, Y. Zheng, J. Xue, and P. H. Holloway, "Stable and efficient quantum-dot light-emitting diodes based on solution-processed multilayer structures," Nat. Photonics, vol. 5, no. 9, pp. 543-548, 2011.

[38] H. Peng, W. Wang, and S. Chen, "Efficient Quantum-Dot Light-Emitting Diodes With 4,4,4-Tris(N-Carbazolyl)-Triphenylamine (TcTa) Electron-Blocking Layer," IEEE Electron Device Lett., vol. 36, no. 4, pp. 369-371, 2015.

[39] J. Kwak et al., "Bright and efficient full-color colloidal quantum dot light-emitting diodes using an inverted device structure," Nano Lett., vol. 12, no. 5, pp. 2362-2366, 2012.

[40] B. S. Mashford et al., "High-efficiency quantum-dot light-emitting devices with enhanced charge injection," Nat. Photonics, vol. 7, no. 5, pp. 407-412, 2013.

[41] W. Wang, H. Peng, and S. Chen, "Highly transparent quantum-dot light-emitting diodes with sputtered indium-tin-oxide electrodes," J. Mater. Chem. C, vol. 4, no. 9, pp. 1838-1841, 2016.

[42] J. Meyer et al., "Transparent inverted organic light-emitting diodes with a tungsten oxide buffer layer," Adv. Mater., vol. 20, no. 20, pp. 3839-3843, 2008.

[43] G. Parthasarathy, C. Adachi, P. E. Burrows, and S. R. Forrest, "High-efficiency transparent organic light-emitting devices," Appl. Phys. Lett., vol. 76, no. 15, pp. 2128-2130, 2000.

[44] Y. J. Lee et al., "Development of inverted OLED with top ITO anode by plasma damage-free sputtering," Thin Solid Films, vol. 517, no. 14, pp. 4019-4022, 2009.

[45] D. H. Lee, Y. P. Liu, K. H. Lee, H. Chae, and S. M. Cho, "Effect of hole transporting materials in phosphorescent white polymer light-emitting diodes," Org. Electron. physics, Mater. Appl., vol. 11, no. 3, pp. 427-433, 2010.

[46] P. D'Angelo et al., "Electrical transport properties characterization of PVK (poly N-vinylcarbazole) for electroluminescent devices applications," Solid. State. Electron., vol. 51, no. 1, pp. 101-107, 2007.

[47] Q. Sun et al., "Bright, multicoloured light-emitting diodes based on quantum dots," Nat. Photonics, vol. 1, no. 12, pp. 717-722, 2007.

[48] Q. Sun, D. W. Chang, L. Dai, J. Grote, and R. Naik, "Multilayer white polymer light-emitting diodes with deoxyribonucleic acid-cetyltrimetylammonium complex as a hole-transporting/electron-blocking layer," Appl. Phys. Lett., vol. 92, no. 25, 2008.

[49] L. N. Ismail, Z. Habibah, M. H. Abdullah, S. H. Herman, and M. Rusop, "Electrical properties of spin coated PMMA for OFETs applications," Int. Conf. Electron. Devices, Syst. Appl., pp. 333-338, 2011.

[50] B. C. Shekar, S. Sathish, and R. Sengoden, "Spin coated nano scale PMMA films for organic thin film transistors," Phys. Procedia, vol. 49, no. 0, pp. 145-157, 2013.

[51] H. Q. Zhang, Y. Jin, and Y. Qiu, "The optical and electrical characteristics of PMMA film prepared by spin coating method," IOP Conf. Ser. Mater. Sci. Eng., vol. 87, no. 1, 2015.

[52] G. Venturi et al., "Dislocation-related trap levels in nitride-based light emitting diodes," Appl. Phys. Lett., vol. 104, no. 21, 2014.

[53] S. Reineke, M. Thomschke, B. Lüssem, and K. Leo, "White organic light-emitting diodes: Status and perspective," 2013.

[54] "APSYS User's Manual." http://www.crosslight.com, 2005.

[55] Z. T. Huang et al., "Electron transport in solution-grown TIPS-pentacene single crystals: Effects of gate dielectrics and polar impurities," Chinese Chem. Lett., vol. 27, no. 12, pp. 1781-1787, 2016.

What is claimed is:

1. A quantum-dot (QD) light-emitting diode (QLED) device comprising:
an active emission region, said active emission region comprising n QD layers interleaved with (n−1) quantum-barrier (QB) layers where n is a positive integer greater than one, such that each QB layer is sandwiched between two adjacent QD layers, and two outermost layers of said active emission region are two of the n QD layers.

2. The QLED device of claim 1, wherein each QD layer comprises Cadmium Selenide/Zinc Sulfide (CdSe/ZnS).

3. The QLED device of claim 1, wherein each QB layer comprises Poly(methyl methacrylate) (PMMA).

4. The QLED device of claim 1, wherein $2 \leq n \leq 6$.

5. The QLED device of claim 1, wherein the thickness of each QD layer is about eight times of that of each QB layer.

6. The QLED device of claim 1, wherein the thickness of each QD layer is about 15 nm to 35 nm, and wherein the thickness of each QB layer is about 1 nm to 5 nm.

7. The QLED device of claim 1 further comprising:
an electron-transport layer (ETL);
a hole-injection layer (HIL); and
a hole-transport layer (HTL);
wherein said ETL and HIL sandwich the active emission region therebetween; and
wherein said HTL is sandwiched between the active emission region and the HIL.

8. The QLED device of claim 7, wherein the HTL comprises poly(9-vinlycarbazole) (PVK); and
wherein the ETL comprises synthesized ZnO nanocrystals, and the HIL comprises poly(3,4-ethylenedioxythiophene) polystyrene sulfonate (PEDOT:PSS).

9. The QLED device of claim 8, further comprising:
a cathode layer coupled to the ETL, the cathode layer comprising silver;
a transparent anode layer coupled to the HIL, said anode layer comprising Indium Tin Oxide (ITO); and
a transparent substrate coupled to the anode layer.

10. The QLED device of claim 1, wherein each QB layer has a conductive band higher than that each QD layer.

11. The QLED device of claim 10, wherein the energy at the valence band of each QB layer is higher than the energy at the valence band of each QD layer.

12. The QLED device of claim 1, wherein each QB layer comprises PVK, 4,4'-Cyclohexylidenebis[N,N-bis(4-methylphenyl)benzenamine] (TAPC), or Poly[N,N'-bis(4-butylphenyl)-N,N'-bisphenylbenzidine] (Poly-TPD).

13. A quantum-dot light-emitting diode (QLED) device comprising a plurality of layers sequentially coupled together, the plurality of layers comprising, from a first side to a second side thereof:
a cathode layer;
an electron-transport layer (ETL);
an active emission region;
a hole-injection layer (HIL); and
an anode layer;
wherein the active emission region comprises n quantum-dot (QD) layers interleaved with (n−1) quantum-barrier (QB) layers where n is a positive integer greater than one, such that each QB layer is sandwiched between two adjacent QD layers, and two outermost layers of said active emission region are two of the n QD layers.

14. The QLED device of claim 13, wherein $2 \leq n \leq 6$.

15. The QLED device of claim 13, wherein the thickness of each QD layer is about eight times of that of each QB layer.

16. The QLED device of claim 13, wherein the thickness of each QD layer is about 15 nm to 35 nm, and wherein the thickness of each QB layer is about 1 nm to 5 nm.

17. The QLED device of claim 13 further comprising:
a hole-transport layer (HTL) sandwiched between the active emission region and the HIL; and
a transparent substrate coupled to the anode layer on the second side thereof;
wherein:
each QD layer comprises Cadmium Selenide/Zinc Sulfide (CdSe/ZnS),
each QB layer comprises Poly(methyl methacrylate) (PMMA),
the cathode layer comprises silver, the anode layer comprises Indium Tin Oxide (ITO),
the ETL comprises synthesized ZnO nanocrystals,
the HIL comprises poly(3,4-ethylenedioxythiophene) polystyrene sulfonate (PEDOT:PSS), and
the HTL comprises poly(9-vinlycarbazole) (PVK);
wherein the anode layer is a transparent layer coated on the substrate; and
wherein when a voltage is applied between the anode and cathode of the QLED device, the QLED device emits light from the second side.

18. The QLED device of claim 13, wherein each QB layer has a conductive band higher than that each QD layer.

19. The QLED device of claim 18, wherein the energy at the valence band of each QB layer is higher than the energy at the valence band of each QD layer.

20. The QLED device of claim 13, wherein each QB layer comprises PVK, 4,4'-Cyclohexylidenebis[N,N-bis(4-methylphenyl)benzenamine] (TAPC), or Poly[N,N'-bis(4-butylphenyl)-N,N'-bisphenylbenzidine] (Poly-TPD).

* * * * *